US011934132B2

(12) United States Patent
Yasuda

(10) Patent No.: US 11,934,132 B2
(45) Date of Patent: Mar. 19, 2024

(54) IMAGE FORMING APPARATUS

(71) Applicant: Makoto Yasuda, Kanagawa (JP)

(72) Inventor: Makoto Yasuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/051,973

(22) Filed: Nov. 2, 2022

(65) Prior Publication Data

US 2023/0288859 A1 Sep. 14, 2023

(30) Foreign Application Priority Data

Dec. 24, 2021 (JP) ................................ 2021-210989

(51) Int. Cl.
*G03G 15/00* (2006.01)
*G03G 15/043* (2006.01)

(52) U.S. Cl.
CPC ....... *G03G 15/5041* (2013.01); *G03G 15/043* (2013.01); *G03G 2215/00063* (2013.01)

(58) Field of Classification Search
CPC ............. G03G 15/043; G03G 15/5041; G03G 15/5054; G03G 15/5058; G03G 15/5062
See application file for complete search history.

(56) References Cited

U.S. PATENT DOCUMENTS

2006/0099009 A1 5/2006 Miyamoto et al.
2006/0120767 A1 6/2006 Miyamoto et al.
2007/0140749 A1 6/2007 Miyamoto et al.
2008/0292981 A1 11/2008 Toda et al.
2009/0148186 A1 6/2009 Yasuda et al.
2010/0330475 A1 12/2010 Tamoto et al.
2011/0194863 A1 8/2011 Matsumoto et al.
2012/0321330 A1 12/2012 Kudo et al.
2013/0278943 A1 10/2013 Kurosawa et al.
2015/0010337 A1 1/2015 Morinaga et al.
2015/0037049 A1 2/2015 Shiraishi et al.
2015/0050033 A1 2/2015 Kasai et al.
2015/0139710 A1 5/2015 Hasegawa et al.
(Continued)

FOREIGN PATENT DOCUMENTS

JP 2014-164202 9/2014
JP 2019-101125 6/2019

*Primary Examiner* — Hoang X Ngo
(74) *Attorney, Agent, or Firm* — IPUSA, PLLC

(57) ABSTRACT

An image forming apparatus includes an image forming device to form an image on an image bearer based on a prescribed image-forming condition, and circuitry to change the prescribed image-forming condition and correct image-density unevenness in an image-width direction orthogonal to an image conveyance direction of the image bearer. In the image forming apparatus, the circuitry calculates a corrective value of the prescribed image-forming condition for each one of positions in the image-width direction, based on unevenness-in-density corrective values for the multiple positions in the image-width direction and relational values indicating a relation between the multiple unevenness-in-density corrective values and the corrective value of the prescribed image-forming condition, and the circuitry corrects the image-density unevenness in the image-width direction based on the corrective value of the prescribed image-forming condition. In the image forming apparatus, the multiple relational values correspond to portions in the image-width direction.

8 Claims, 18 Drawing Sheets

(56) References Cited

U.S. PATENT DOCUMENTS

| | | | |
|---|---|---|---|
| 2015/0268618 A1 | 9/2015 | Itoh et al. | |
| 2015/0370206 A1 | 12/2015 | Hitosugi et al. | |
| 2016/0070198 A1 | 3/2016 | Morinaga et al. | |
| 2016/0139537 A1 | 5/2016 | Kasai et al. | |
| 2016/0147174 A1 | 5/2016 | Yasuda et al. | |
| 2016/0170321 A1 | 6/2016 | Komori et al. | |
| 2016/0313668 A1 | 10/2016 | Kasai et al. | |
| 2017/0017177 A1* | 1/2017 | Iwata | G03G 15/043 |
| 2017/0199480 A1 | 7/2017 | Morinaga et al. | |
| 2019/0163108 A1 | 5/2019 | Sakurada et al. | |
| 2020/0074598 A1 | 3/2020 | Yamamura et al. | |
| 2020/0294207 A1 | 9/2020 | Yamamura et al. | |

* cited by examiner

IMAGE FORMING APPARATUS

CROSS-REFERENCE TO RELATED APPLICATION

This patent application is based on and claims priority pursuant to 35 U.S.C., § 119(a) to Japanese Patent Application No. 2021-210989, filed on Dec. 24, 2021, in the Japan Patent Office, the entire disclosure of which is hereby incorporated by reference herein.

TECHNICAL FIELD

Embodiments of the present disclosure relate to an image forming apparatus.

BACKGROUND ART

In the related art, image forming apparatuses are known including an image forming device that forms an image on an image bearer based on predetermined conditions for image formation and a corrector that changes the predetermined conditions for image formation to correct the unevenness in the density of an image in the image-width direction orthogonal to the image conveyance direction of the image bearer.

Moreover, image forming apparatuses are known in the related art in which the image density (ID) of each one of the multiple positions of the predetermined adjustment patterns for the unevenness in density, which are formed by the image forming device, in the main scanning direction parallel to the image-width direction is detected by a density detection device and the unevenness in the density of an image in the main scanning direction is corrected based on the results of the above detection.

SUMMARY

Embodiments of the present disclosure described herein provide an image forming apparatus including an image forming device to form an image on an image bearer based on a prescribed image-forming condition, and circuitry to change the prescribed image-forming condition and correct image-density unevenness in an image-width direction orthogonal to an image conveyance direction of the image bearer. In the image forming apparatus, the circuitry calculates a corrective value of the prescribed image-forming condition for each one of a plurality of positions in the image-width direction, based on a plurality of unevenness-in-density corrective values for the multiple positions in the image-width direction and a plurality of relational values indicating a relation between the multiple unevenness-in-density corrective values and the corrective value of the prescribed image-forming condition, and the circuity corrects the image-density unevenness in the image-width direction based on the corrective value of the prescribed image-forming condition. In the image forming apparatus, the multiple relational values correspond to a plurality of portions in the image-width direction, and the circuitry calculates the corrective value of the prescribed image-forming condition for each one of the multiple positions in the image-width direction, based on the multiple unevenness-in-density corrective values and the multiple relational values corresponding to the multiple portions in the image-width direction including the multiple positions in the image-width direction.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

Figure 1:
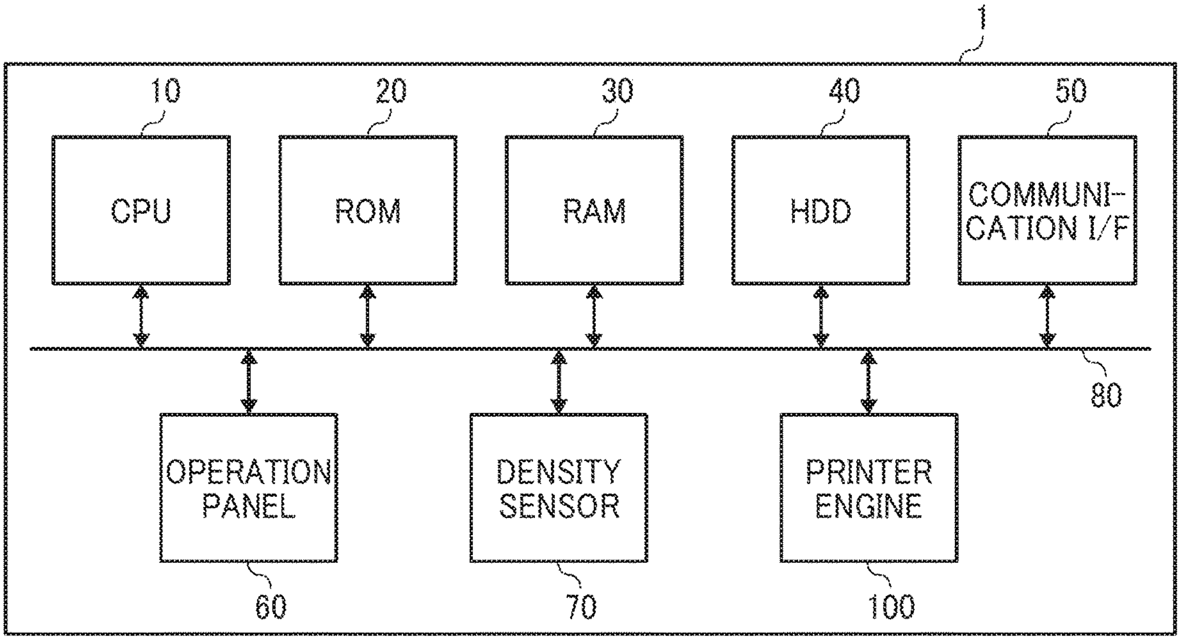
FIG. 1 is a schematic block diagram illustrating a hardware configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or, addition of one or more other features, integers, steps, operations, elements, components, and/or groups thereof.

In describing example embodiments illustrated in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

An image forming apparatus according to an embodiment of the present disclosure is described below with reference to the drawings. In the drawings and the description of the embodiments of the present disclosure, like reference signs denote elements such as members or components having similar shapes or similar functionality, and overlapping description may be omitted where appropriate.

The image-forming apparatus 1 according to the present embodiment may be referred to as a multifunction printer or multifunction peripheral (MFP). More specifically, the image forming apparatus 1 according to the present embodiment has, for example, a photocopying function, a facsimile (FAX) function, a printing function, a scanning function, a function to perform image processing on an input image, and a function to store or distribute the input image. The term input image used in the present embodiment refers to, for example, the image of a document scanned by the scanning function and an image input by the printing function or the facsimile (FAX) function. In the present embodiment, the image data that is processed by the image forming apparatus 1 includes not only the image dam but also the data that does not contain any image data. In other words, the image data that is processed by the image forming apparatus 1 may be the data of only texts.

FIG. 1 is a schematic block diagram illustrating a hardware configuration of the image forming apparatus 1 according to the present embodiment.

As illustrated in FIG. 1, the image forming apparatus 1 according to the present embodiment includes a central processing unit (CPU) 10, a read only memory (ROM) 20, a random access memory (RAM) 30, a hard disk drive (HDD) 40, an external communication interface (I/F) 50 used to connect to an external device or the network, an operation panel 60 a density sensor 70, and a printer engine 100. Moreover, the image forming apparatus 1 according to the present embodiment includes a system bus 80 that interconnects the above elements.

The CPU 10 controls the operation of the image forming apparatus 1. In other words, the CPU 10 uses a random access memory (RAM) 30 as a work area, and executes a program stored in the ROM 20 or the HDD 40 to control the operations of the image forming apparatus 1. Due to such a configuration, various kinds of functions such as the photocopying function, the scanning function, the facsimile (FAX) function, and the printing function as described above can be implemented.

The ROM 20 is a read-only nonvolatile semiconductor memory or storage device that can store a computer program or data even when the power is switched off. The RAM 30 is a volatile semiconductor memory or storage device that temporarily stores data or a computer program.

The HDD 40 is a nonvolatile storage device or memory that stores data or a computer program. The program or the data that is stored in the HDD 40 includes, for example, an operating system (OS) that is basic software to control the entirety of the image forming apparatus 1, various kinds of application programs that are executed and operates on the OS, or operating conditions of the various types of functions as described above. For example, the operations of the image forming apparatus 1 may be stored in the operations that are performed by executing the above various kinds of functions, which may be referred to as a job in the following description, on an as-needed basis.

The external communication interface 50 is an interface circuit used to make the image forming apparatus 1 connected to the network such as the Internet or a local area network (LAN).

The image forming apparatus 1 can receive, for example, printing instructions or image data from an external device through the external communication interface 50.

The operation panel 60 according to the present embodiment receives various kinds of inputs through the operation made by a user, and displays various types of information such as the accepted operation, the operating conditions of the image forming apparatus 1, and the setting of the image forming apparatus 1. By way of example, the operation panel 60 may be configured b a liquid crystal display (LCD) provided with touch panel functionality. However, no limitation is indicated thereby. Alternatively, by way of example, the operation panel 60 may be configured by an organic electroluminescence (EL) display provided with touch panel functionality. In addition to or in place of the above display, an operating part such as a hardware key or a display unit such as a lamp may be arranged. The operation panel 60 is controlled by the CPU 10.

The printer engine 100 that serves as an image forming device is hardware used to implement for example, a printing function, a photocopying function, and a facsimile (FAX) function. In other words, the printer engine 100 according to the present embodiment is hardware such as a printer, a photocopier, a facsimile (FAX), and a scanner. For example, electrophotography and inkjet printing may be applied to the printing function according to the present embodiment. However, no limitation is intended thereby. Alternatively, any particular optional function or device such as a finisher that sorts the printed sheets of paper or an automatic document feeder (ADF) that automatically feeds the sheet of document may be applied to the printer engine 100 according to the present embodiment. The printer engine 100 is controlled by the CPU 10.

The image funning apparatus 1 according to the present embodiment may further include an external interface circuit. In such a configuration, the image forming apparatus 1 according to the present embodiment may perform the data reading operation and data writing operation on an external memory such as a compact disk (CD), a digital versatile disk (DVD), a secure digital (SD) memory card, or a universal serial bus (USB) memory through an external interface circuit.

The program that is stored in the ROM 20 or the HDD 40 is readable and executable by a computer or one or more processors. Such a program may be installed in the ROM 20 or the HDD 40 when the image forming apparatus 1 according to the present embodiment is manufactured or is to be shipped. Alternatively, such a program may be installed after the image forming apparatus 1 is sold. If such a program is to be installed after sales, the program may be installed through an external-memory drive using an external storage memory in which the program is stored, or the program may be installed through the network using the external communication interface 50.

Figure 2:
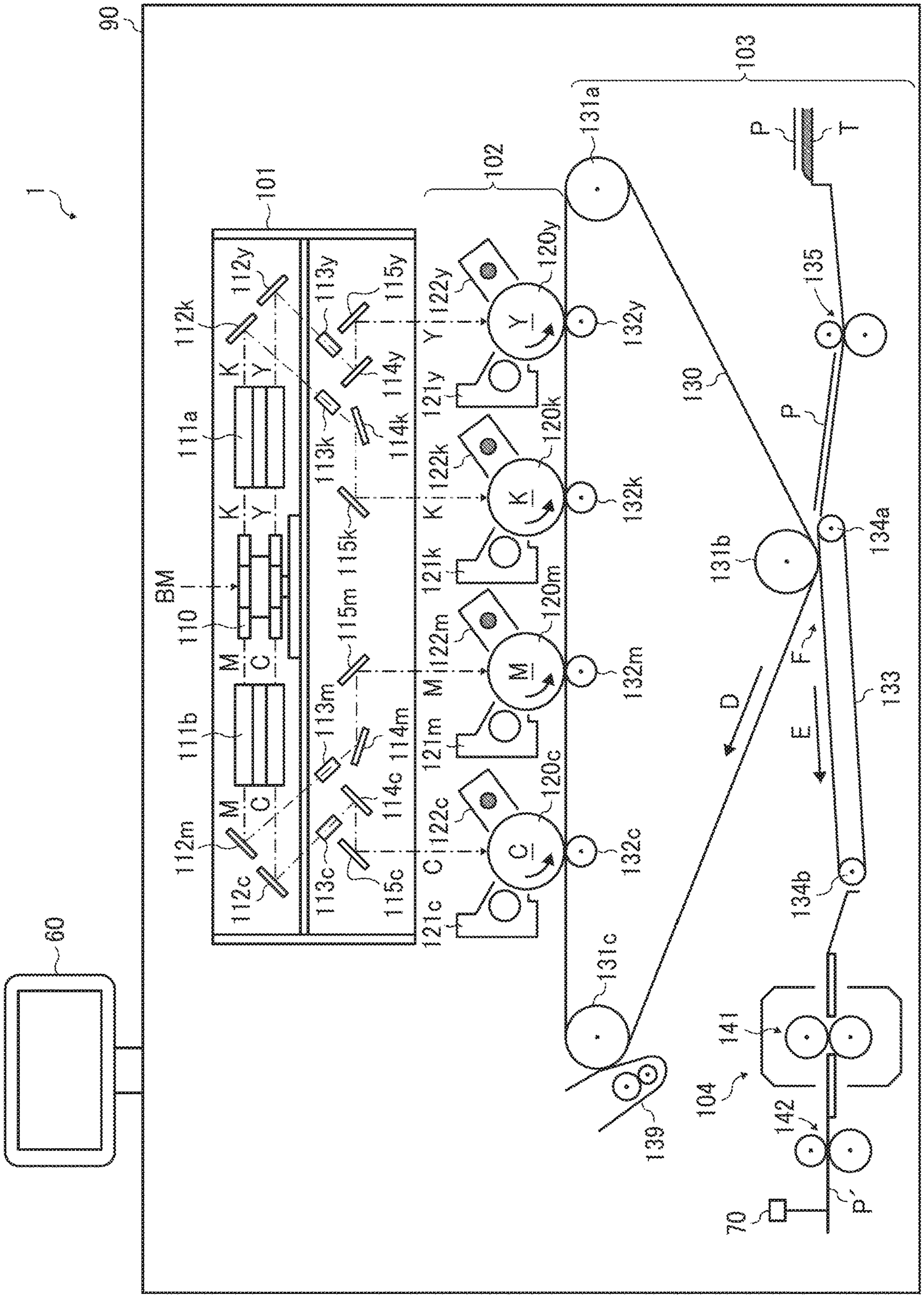
FIG. 2 is a schematic block diagram illustrating a hardware configuration of a printer engine of the image forming apparatus of FIG. 1.

FIG. 2 is a schematic diagram illustrating a hardware configuration of the printer engine 100 according to the present embodiment.

For the sake of explanatory convenience, for example, the operation panel 60 and the density sensor 70 are illustrated in some of the drawings.

The printer engine 100 according to the present embodiment is arranged inside the housing 90, and is provided with an exposure device 101 that serves as an optical writing unit, an image forming unit 102, a transfer device 103, and a fixing device 104. On an upper portion of the housing 90, the operation panel 60 is arranged.

The image forming unit 102 according to the present embodiment includes a photoconductor 120 used for yellow (Y) color, a photoconductor 120*k* used for black (K) color, a photoconductor 120*m* used for magenta (M) color, and a photoconductor 120*c* used tot cyan (C) color, each of winch serves as an image bearer. The photoconductor 120*y*, the photoconductor 120*k*, the photoconductor 120*m*, and the photoconductor 120*c* of the image forming unit 102 are provided with a developing device 121*y* used for yellow (Y) color, a developing device 121*k* used for black (K) color, a developing device 121*m* used for magenta (M) color, and a developing device 121*c* used for cyan (C) color, respectively, each of which serves as a development unit. Further, the photoconductor 120*y*, the photoconductor 120*k*, the photoconductor 120*m*, and the photoconductor 120*c* of the image forming unit 102 are provided with a charger 122*y* used for yellow (Y) color, a charger 122*k* used for black (K) color, a charger 122*m* used for magenta (M) color, and a charger 122*c* used for cyan (C) color, respectively, each of which serves as a current-carrying part.

The transfer device 101 according to the present embodiment includes, for example, an intermediate transfer belt 130 and a secondary transfer belt 133.

The fixing device 104 that serves as a fixing unit includes, for example, a fixing device 141 and an output roller pair 142.

The exposure device 101 according to the present embodiment exposes the photoconductor 120*y*, the photoconductor 120*k*, the photoconductor 120*m*, and the photoconductor 120*c* of the image forming unit 102 and emits the write light to write a latent image on each one of the multiple photoconductors based on the image data. In other words, laser beams are selectively emitted at a writing position corresponding to the image patterns of the image data and with the amount of write light or the exposure value corresponding to the image density (ID). For example, the light that is emitted from a laser beam source or a light-emitting diode (LED) light source may be used as the write light. In the following description, cases in which a laser beam source having a laser diode (LD) is used as the write light are described.

Firstly, the laser beam BM that is emitted from the laser beam source is deflected by the polygon mirror 110, and is incident on a pair of scanning lenses 111*a* and 111*b* each of which includes an fθ lens. The operations and configuration of an optical system from which the laser beam BM is emitted from the laser beam source will be described later in detail.

The laser beam as emitted above may include a plurality of laser beams whose number corresponds to the multicolored image of yellow (Y), black (K), magenta (M), and cyan (C). Those multiple laser beams pass through the pair of scanning lenses 111*a* and 111*b*, and then are reflected by a plurality of reflection mirrors 112*y* 112*k*, 112*m*, and 112*c*.

For example, a laser beam Y of yellow color passes through the scanning lens 111*a*, and is reflected by the reflection mirror 112. Then, the laser beam Y of yellow color is incident on a wide toroidal lens (WTL) 113*y*. As the same applies to the multicolored laser beams K, M, and C of black (K), magenta (M), and cyan (C), respectively, its detailed description is omitted.

The multiple laser beams Y, K, M, and C are incident on, the multiple wide toroidal lenses (WTL) 113*y*, 113*k*, 113*m*, and 113*c*, respectively. The multiple wide toroidal lenses (WIT) lenses 113*y*, 113*k*, 113*m*, and 113*c* form those laser beams, and then deflect the multiple laser beams Y, K, M, and C toward the reflection mirrors 114*y*, 114*k*, 114*m*, and 114*c*. Then, the multiple laser beams Y, K, M, and C are further reflected by reflection mirrors 115*y*, 115*k*, 115*m*, and 115*c*, and are emitted to the multiple photoconductors 120*y*, 120*k*, 120*m*, and 120*c*, respectively as the multiple laser beams Y, K, M, and C that are used to perform exposures.

The timings at which the multiple photoconductors 120*y*, 120*k*, 120*m*, and 120*c* are irradiated with the multiple laser beams Y, K, M, and C in the main scanning direction and the sub-scanning direction of the multiple photoconductors 120*y*, 120*k*, 120*m*, and 120*c*, which correspond to the image-width direction and the image conveyance direction, respectively, are controlled in a synchronous manner. Typically, each one of the multiple photoconductors according to the present embodiment is shaped like as drum whose longer-side direction is parallel to the main scanning direction, and may be referred to as a photoconductor drum.

In the following description, the main scanning direction of the multiple photoconductors 120*y*, 120*k*, 120*m*, and 120*c* is defined as the scanning direction of the laser beam, and the sub-scanning direction is defined as the direction orthogonal to the main scanning direction. In other words, the sub-scanning direction of the multiple photoconductors 120_y_, 120_k_, 120_m_, and 120_c_ is defined as the direction in which each one of the multiple photoconductors 120_y_, 120_k_, 120_m_, and 120_c_ rotates.

Each one of the multiple photoconductors 120_y_, 120_k_, 120_m_, and 120_c_ according to the present embodiment has a photoconductive layer that includes at least a charge generation layer (CGL) and a charge transport laser (CTL) on an electrically-conductive drum made of, for example, aluminum.

The above photoconductive layers are electrically charged depending on the charging bias on then surfaces by the charger 122_y_, the charger 122_k_, the charger 122_m_, and the charger 122_c_ that are provided for the multiple photoconductors 120_y_, 120_k_, 120_m_, and 120_c_, respectively. Each one of those photoconductors serves as a current-carrying part. Each one of the charger 122_y_, the charger 122_k_, the charger 122_m_, and the charger 122_c_ may include, for example, a corotron charger, a scorotron charger, or a charging roller.

The electrostatic charge that is applied to each one of the multiple photoconductors 120_y_, 120_k_, 120_m_, and 120_c_ by the charger 122_y_, the charger 122_k_, the charger 122_m_, and the charger 122_c_, respectively, decreases as exposed to light depending on the image patterns by the multiple laser beams Y, K, M, and C each of which serves as write light. As a result, the electrical potential decreases only at the portions that are exposed by the laser beams Y, K, M, and C, and an electrostatic latent image is formed on each one of the multiple photoconductors 120_y_, 120_k_, 120_m_, and 120_c_.

The toner whose amount corresponds to the developing bias, i.e., the potential difference (PD) between the electrostatic latent image potential and the developing sleeve potential adheres to the electrostatic latent images that are formed on the multiple photoconductors 120_y_, 120_k_, 120_m_, and 120_c_, respectively, by the multiple developing devices 121_y_, 121_k_, 121_m_, and 121_c_, each of which serves as a development unit. Due to such a configuration, the multiple electrostatic latent images that are formed on the photoconductors 120_y_, 120_k_, 120_m_, and 120_c_ are developed, and multicolor toner images are formed on the multiple photoconductors 120_y_, 120_k_, 120_m_ and 120_c_. Each one of the multiple developing devices 121_y_, 121_k_, 121_m_, and 121_c_ includes, for example, a developing sleeve, a toner supply roller, and a control blade.

The multicolor toner images that are formed on the multiple photoconductors 120_y_, 120_k_, 120_m_, and 120_c_ by performing development are primarily transferred onto the intermediate transfer belt 130 so as to be superimposed on top of one another. The intermediate transfer belt 130 serves as an image bearer and is moved by the conveyance rollers 131_a_, 131_b_, and 131_c_ in the direction indicated by an arrow D. In order to rotate and work together with the photoconductors 120_y_, 120_k_, 120_m_, and 120_c_, a plurality of primary transfer rollers 132_y_, 132_k_, 132_m_, and 132_c_ are arranged. The multicolored toner images that are transferred onto the intermediate transfer belt 130 are conveyed to a secondary transfer position F as the intermediate transfer belt 130 rotates on the axis.

The secondary transfer belt 133 is looped around a pair of conveyance rollers 134_a_ and 134_b_, and a sheet P is conveyed in the direction indicated by an arrow E as the pair of conveyance rollers 134_a_ and 134_b_ rotate.

The sheet P that serves as a recording material such as a high-quality paper or a plastic sheet is fed by the conveyance roller 135 from a sheet tray T such as a feed tray to the secondary transfer position F. The secondary transfer bias is applied at the secondary transfer position F, and the toner image that is borne onto the intermediate transfer belt 130 is transferred to the sheet P that is suctioned and held onto the secondary transfer belt 133. The sheet P is conveyed in the sub-scanning direction orthogonal to the main scanning direction.

The sheet P onto which the toner image has been transferred from the intermediate transfer belt 130 is fed to the fixing device 104 that serves as a fixing unit as conveyed by the secondary transfer belt 133. The fixing device 104 according to the present embodiment is configured by the fixing device 141 such as a fixing roller including, for example, silicone rubber and fluoric rubber. The fixing device 104 according to the present embodiment pressurizes and heats the sheet P and the toner image to fix the toner image onto the sheet P. The sheet P' onto which the toner image has been fixed is ejected to the outside of the fixing device 104 by the output roller pair 142.

The density sensor 70 that serves as a density detection device 190 is arranged downstream from the fixing device 104 in the sheet conveyance direction, and detects the image density (ID) at a plurality of positions of the images of the adjustment patterns for the unevenness in density on the sheet of paper P' that is ejected through the fixing device 104 in the main scanning direction. The density sensor 70 according to the present embodiment will be described later in detail, but the unevenness in the density of an image in the main scanning direction is corrected based on the image density (ID) of the adjustment patterns for the unevenness in density detected by the density sensor 70. The unevenness in the density of an image in the main scanning direction may be referred to as the unevenness-in-density correcting processes where appropriate in the following description.

The transfer residual toner is removed from the intermediate transfer belt 130 that has transferred toner image to the sheet by a cleaning unit 139 including a cleaning blade, and then the process proceeds to the subsequent processes of image formation.

In the present embodiment, the density sensor 70 is arranged downstream from the fixing device 104 in the sheet conveyance direction. However, no limitation is intended thereby. For example, the density sensor 70 according to the present embodiment may be arranged near the conveyance roller 131_a_ to detect the image density (ID) of the adjustment patterns for the unevenness in density formed on the intermediate transfer belt 130. In other words, for example, the density sensor 70 according to the present embodiment may be arranged near the conveyance roller 131_a_ to detect the amount of adhered toner on the adjustment patterns for the unevenness in density per each unit of dimension.

Figure 3:
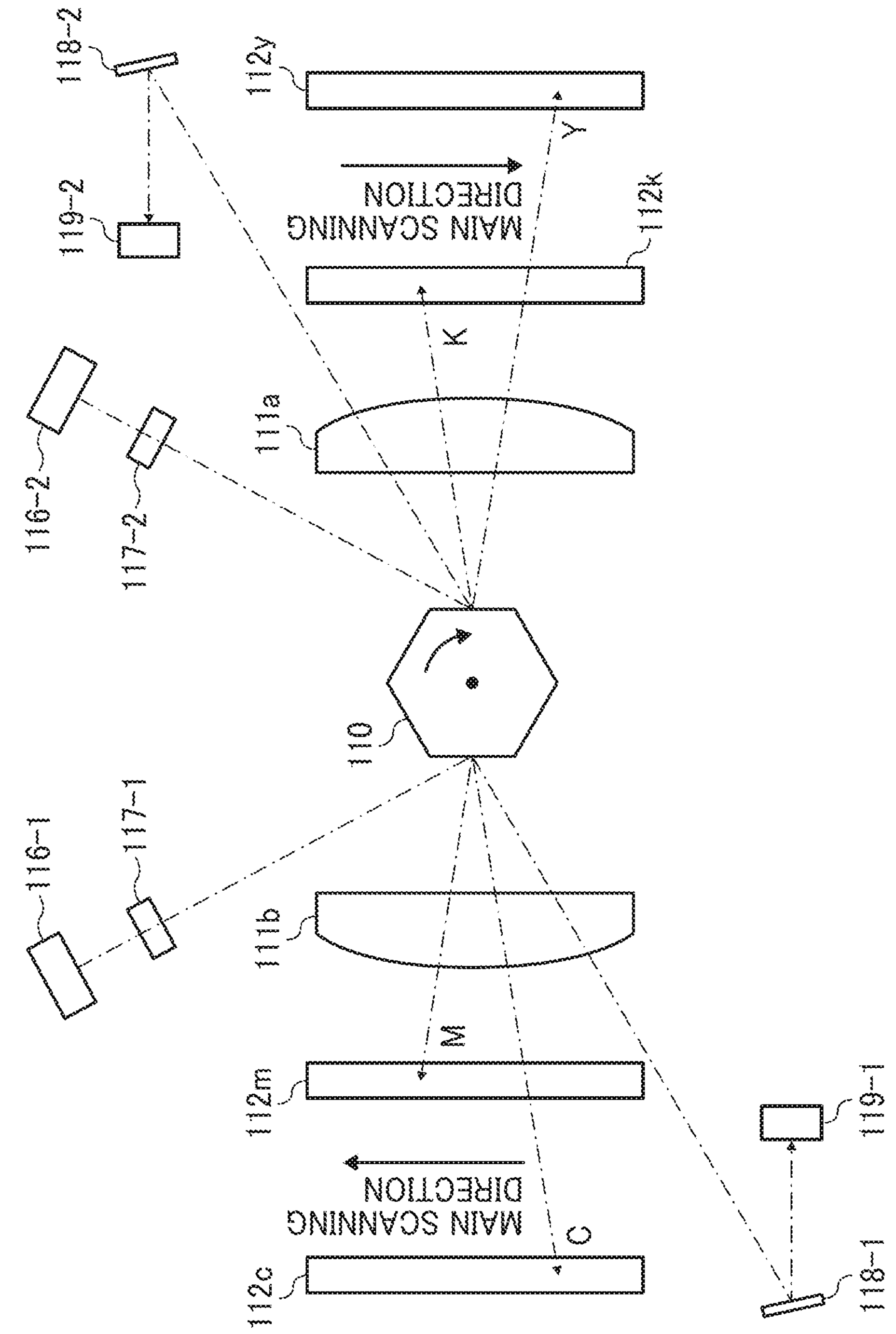
FIG. 3 is a schematic diagram of a pair of light source units of an exposure device of the printer engine of FIG. 2.

FIG. 3 is a schematic diagram of a pair of light source units of the exposure device 101, according to the present embodiment.

The exposure device 101 according to the present embodiment is provided with a pair of laser diode (LD) units 116-1 and 116-2 that serve as a pair of light source units. Each one of the laser diode units 116-1 and 116-2 according to the present embodiment is provided with a laser device, and is driven such that each laser device will selectively emit the laser beams at a writing position corresponding to the image data and with the amount of write light or the exposure value corresponding to the image data.

The laser beam that is emitted from the laser diode unit 116-1 passes through a cylinder lens 117-1, and is incident on the polygon mirror 110 that is driven to rotate by a polygon motor. The laser diode unit 116-1 according to the present embodiment has a pair of laser diodes (LD) at an upper portion and a lower portion of the unit. The laser beam of magenta (M) color that is emitted from the upper portion of the laser diode unit 116-1 is incident on an upper portion of the polygon mirror 110, and the laser beam of cyan (C) color that is emitted from the lower portion of the laser diode unit 116-1 is incident on a lower portion of the polygon mirror 110.

The laser beam of magenta (M) color that is incident on an upper portion of the polygon mirror 110 is deflected as the polygon mirror 110 rotates on the axis, and the deflected laser beam of magenta (M) color passes through the scanning tens 111*b* and is incident on the reflection mirror 112*m*. After that, as described above, the surface of the photoconductor 120M is scanned by the laser beam of magenta (M) color.

The laser beam of cyan (C) color that is incident on a lower portion of the polygon mirror 110 is deflected as the polygon mirror 110 rotates on the axis and the deflected laser beam of can (C) color passes through the scanning lens and is incident on the reflection mirror 112*c*. After that, as described above, the surface of the photoconductor 120C is scanned with the laser beam of cyan (C) color.

A synchronization mirror 118-1 and a synchronization sensor 119-1 are arranged at a writing end in the main scanning direction ahead of the image writing position of a non-writing area in the main scanning direction. The multicolored laser beams M and C that have passed the scanning lens 111*b* are reflected by the synchronization mirror 118-1, and are incident on the synchronization sensor 119-1. As multicolored laser beams M and C are incident on the synchronization sensor 119-1, a synchronization detection signal used to determine the writing timing of those colors in the main scanning direction is output.

Subsequently, the laser beam that is emitted from the laser diode unit 116-2 passes through a cylinder lens 117-2, and is incident on the polygon mirror 110 that is driven to rotate by a polygon motor. The laser diode unit 116-2 according to the present embodiment has a pair of laser diodes (LD) at an upper portion and a lower portion of the unit. The laser beam of black (K) color that is emitted from the upper portion of the laser diode unit 116-2 is incident on an upper portion of the polygon mirror 110, and the laser beam of yellow (Y) color that is emitted from the lower portion of the laser diode unit 116-2 is incident on a lower portion of the polygon mirror 110.

The laser beam of black (K) color that is incident on an upper portion of the polygon mirror 110 is deflected as the polygon mirror 110 rotates on the axis, and the deflected laser beam of black (K) color passes the scanning lens 111*a*, and is incident on the reflection mirror 112*k*. After that, as described above, the surface of the photoconductor 120K is scanned by the laser beam of black (K) color.

The laser beam of yellow (Y) color that is incident on a lower portion of the polygon mirror 110 is deflected as the polygon mirror 110 rotates on the axis, and the deflected laser beam of yellow (Y) color passes the scanning lens 111*a*, and is incident on the reflection mirror 112*y*. After that, as described above, the surface of the photoconductor 120Y is scanned by the laser beam of yellow (Y) color.

A synchronization mirror 118-2 and a synchronization sensor 119-2 are arranged at a writing end in the main scanning direction ahead of the image writing position of a non-writing area in the main scanning direction. The multicolored laser beams K and Y that have passed the scanning lens 111*a* are reflected by the synchronization mirror 118-2, and are incident on the synchronization sensor 119-2. As multicolored laser beams K and Y are incident on the synchronization sensor 119-2, a synchronization detection signal used to determine the writing timing of those colors in the main scanning direction is output.

A configuration or structure of the density sensor 70 is described below with reference to FIG. 4.

Figure 4:
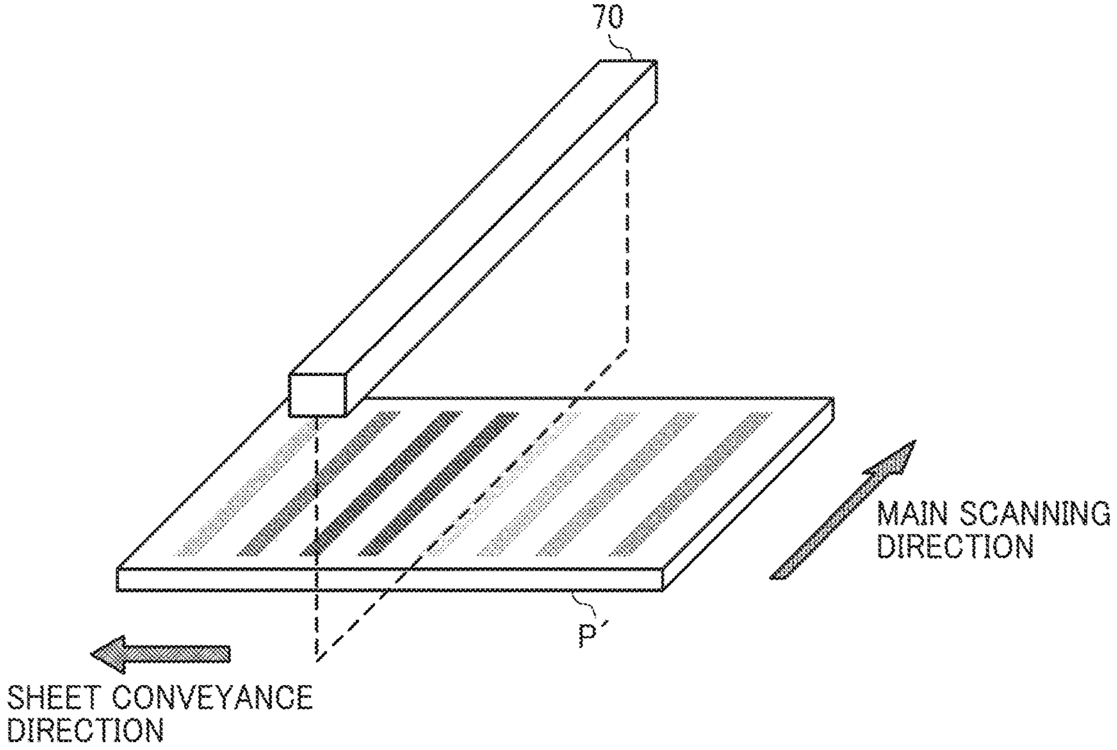
FIG. 4 is a perspective view of a density sensor of the image forming apparatus of FIG. 1.

FIG. 4 is a perspective view of the density sensor 70 according to the present embodiment.

The density sensor 70 has an elongated shape in the main scanning direction. The density sensor 70 according to the present embodiment internally includes an imaging device 71 with an elongated shape in the main scanning direction, and such an imaging device may be referred to as a line sensor. As illustrated in FIG. 4, the detectable width of the density sensor 70 in the main scanning direction is indicated by dotted lines in the main scanning direction. This detectable width is wider than the width of the sheet P' in the main scanning direction. Accordingly, when the sheet P' is conveyed so as to pass within range of the width indicated by the dotted lines in the main scanning direction, the image density (ID) on the entirety of the sheet P' can be detected.

Figure 5:
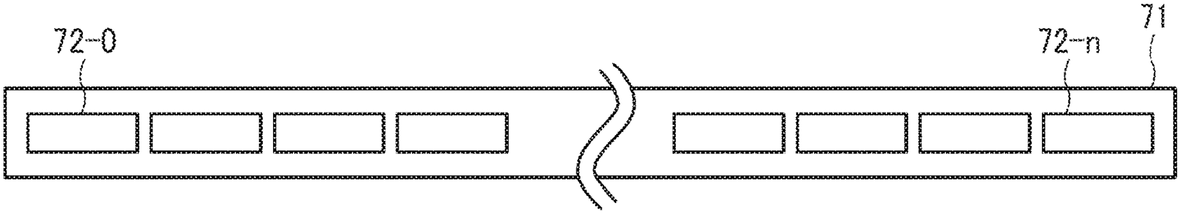
FIG. 5 is a schematic diagram of an imaging device provided for the density sensor of FIG. 4.

FIG. 5 is a schematic diagram of the imaging device 71 provided for the density sensor 70, according to the present embodiment.

As illustrated in FIG. 5, the imaging device 71 according to the present embodiment extends in the main scanning direction, and a plurality of small photoreceptors 72-0 to 72-*n* are aligned in a row in the main scanning direction. When those small photoreceptors do not have to be distinguished from each other, they may be referred to as a plurality of photoreceptors 72 in the following description. The range in which the multiple photoreceptors 72 are aligned in a row serves as the above detectable width of the density sensor 70 in the main scanning direction.

Figure 6:
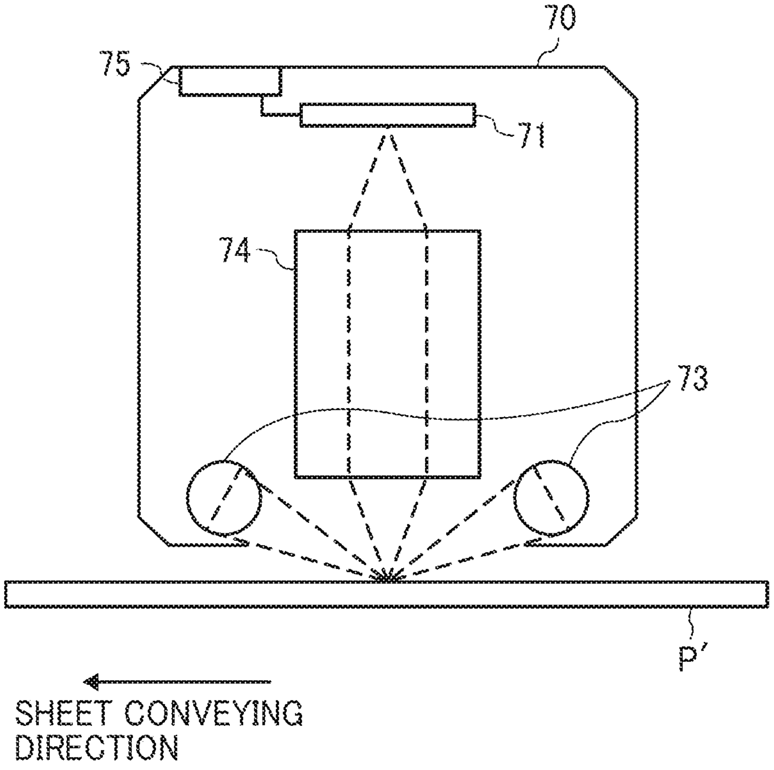
FIG. 6 is a vertical sectional view of the density sensor of FIG. 4 in the main scanning direction.

FIG. 6 is a vertical sectional view of the density sensor 70 in the main scanning direction, according, to the present embodiment.

As illustrated in FIG. 6, the density sensor 70 according to the present embodiment further includes a pair of light sources 73, a lens array 74, and an output circuit 75 internally in addition to the above-described imaging device 71. The dotted lines indicate the light emitted from the pair of light sources 73 according to the present embodiment.

The pair of light sources 73 according to the present embodiment may be, for example, an array of light-emitting diodes (LEDs) or a plurality of light-emitting elements arranged at the edges of light guides. The pair of light sources 73 according to the present embodiment emits the light of red, green, and blue (RGB) colors. The lens array 74 according to the present embodiment may be, for example, a self-focusing (SELFOC) lens (registered trademark).

The light that is emitted from the pair of light sources 73 is reflected by the sheet and the image of the light is formed by the lens array 74. The multiple photoreceptors 72 of the imaging device 71 as illustrated in FIG. 5 receive the light that is formed by the lens array 74, and output a signal according to the received light. The imaging device 71 according to the present embodiment may be composed of, for example, a complementary metal oxide semiconductor (CMOS) sensor or a charge coupled device (CCD) sensor.

The output circuit 75 according to the present embodiment may be composed of, for example, an application-specific integrated circuit (ASIC). The output circuit 75 converts the signal sent from the multiple photoreceptors 72 on the imaging device 71 into the data indicating the image density (ID) at each of the positions of the adjustment patterns for the unevenness in density on the sheet P', and outputs the data indicating the image density (ID). The output data is, for example, the data indicating the image density (ID) of 0 to 255 levels of gradation, which is expressed in 8 bits.

Figure 7:
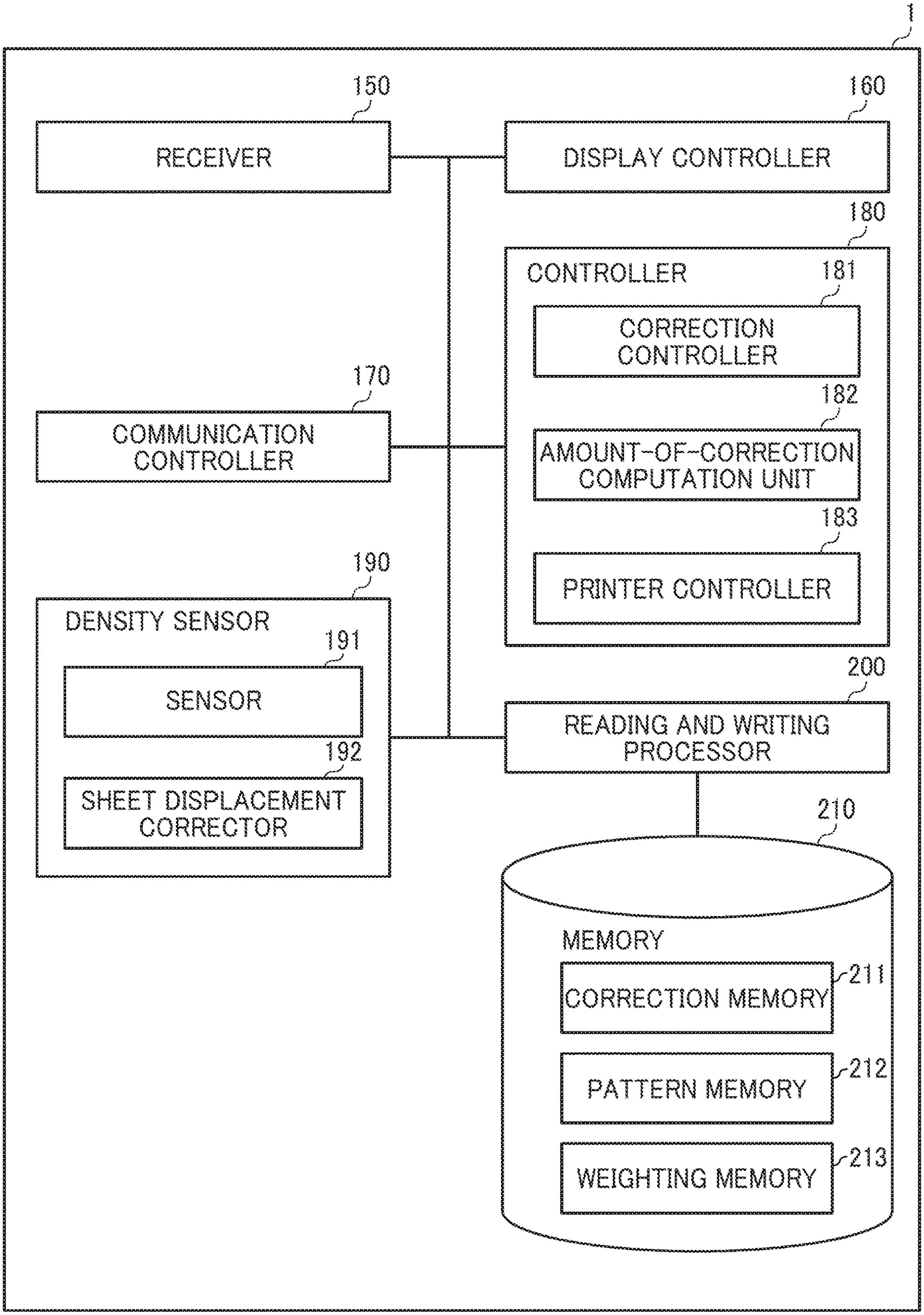
FIG. 7 is a block diagram illustrating a functional configuration of the image forming apparatus of FIG. 1.

FIG. 7 is a diagram illustrating the functional blocks of the image forming apparatus 1 according to the present embodiment.

A receiver 150 according to the present embodiment is implemented by the operation panel 60, and executes a function to display information required for the operation to a user and accept various kinds of inputs from the user. The receiver 150 according to the present embodiment is also implemented by the processes performed by the external communication interface 50, and executes a function to receive various kinds of printing instructions or changes in settings from an external device through the local area network (LAN) or the Internet.

The display controller 160 according to the present embodiment is implemented as the CPU 10 uses, for example, the RAM 30 as a work area and executes a program stored in the ROM 20 or the HDD 40, and executes a function to control the screen displayed on the receiver 150.

The communication controller 170 according to the present embodiment is implemented by the processes performed by the external communication interface 50, and executes a function to email the image data to an external device. When various kinds of setting data are to be obtained from an external device, the communication controller 170 executes a function to communicate with an external device through the network.

The controller 180 according to the present embodiment is implemented as the CPU 10 executes a program or data read from the ROM 20 or the HDD 40 using the RAM 30 as a work area, and executes the functions in the entirety of the image forming apparatus 1 such as the photocopying function, the scanning function, the printing function, and the facsimile (FAX) function.

The controller 180 according to the present embodiment includes a correction controller 181, an amount-of-correction computation unit 182, and a printer controller 183. The correction controller 181 executes a function in the priming function to control the correction of the unevenness in the density of an image in the main scanning direction. The amount-of-correction computation unit 182 executes a function to calculate the corrective value or the amount of correction of the image-forming condition, which is used to correct the unevenness in the density of an image in the main scanning direction. In particular, the printer controller 183 executes a function to control the printer engine 100. The correction controller 181, the amount-of-correction computation unit 182, and the primer controller 183 will be described later in detail.

The density detection device 190 according to the present embodiment is implemented by the density sensor 70, and executes a function to detect the image density (ID) of the adjustment patterns for the unevenness in density, which are formed by the printer engine 100, and to output the results of detection.

The density detection device 190 according to the present embodiment is provided with a sensor 191 and a sheet displacement corrector 192. The sensor 191 according to the present embodiment is implemented by the imaging device 71, and executes a function to detect the image density (ID). The sheet displacement corrector 192 is executed by the output circuit 75. The sheet displacement corrector 192 detects the displacements in the conveyance of the sheet based on the signals that indicate the image density (ID), and outputs the data in which the displacements in the conveyance of the sheet have been corrected as the results of the detection.

A reading and writing processor 200 according to the present embodiment is implemented as the CPU 10 executes a program or data read from the ROM 20 or the HDD 40 using the RAM 30 as a work area, and executes a function to perform processing to store various types of data in the memory 210 or read various types of data stored in the memory 210.

The memory 210 according to the present embodiment is implemented by the processes performed by the ROM 20 or the HDD 40, and executes a function to store, for example, a program, documental data, the image-forming condition used by the image forming apparatus 1 to operate, various types of setting information including the sh sensitivity that serves as the relational value, or a log of operations of the image forming apparatus 1. The image-forming condition may be, for example, charging bias, developing bias, an exposure value or the radiation intensity of write light, and transfer bias.

The various kinds of data that is stored in the memory 210 may be configured or set before shipment of the image forming apparatus 1, and may be updated after the image forming apparatus 1 is sold. Depending on the type of data to be stored, the data may be stored in the RAM 30 on a temporary basis.

The memory 210 according to the present embodiment includes a correction memory 211, a pattern memory 212, and a weighting memory 213. The correction memory 211 executes a function to store how the various kinds of conditions for image formation are corrected. The pattern memory 212 executes a function to store various kinds of predetermined image patterns such as the adjustment patterns for the unevenness in density. The weighting memory 213 executes a function to store the weighting used to calculate the amount of correction for the unevenness-in-density correcting processes, as will be described later in detail.

Figure 8:
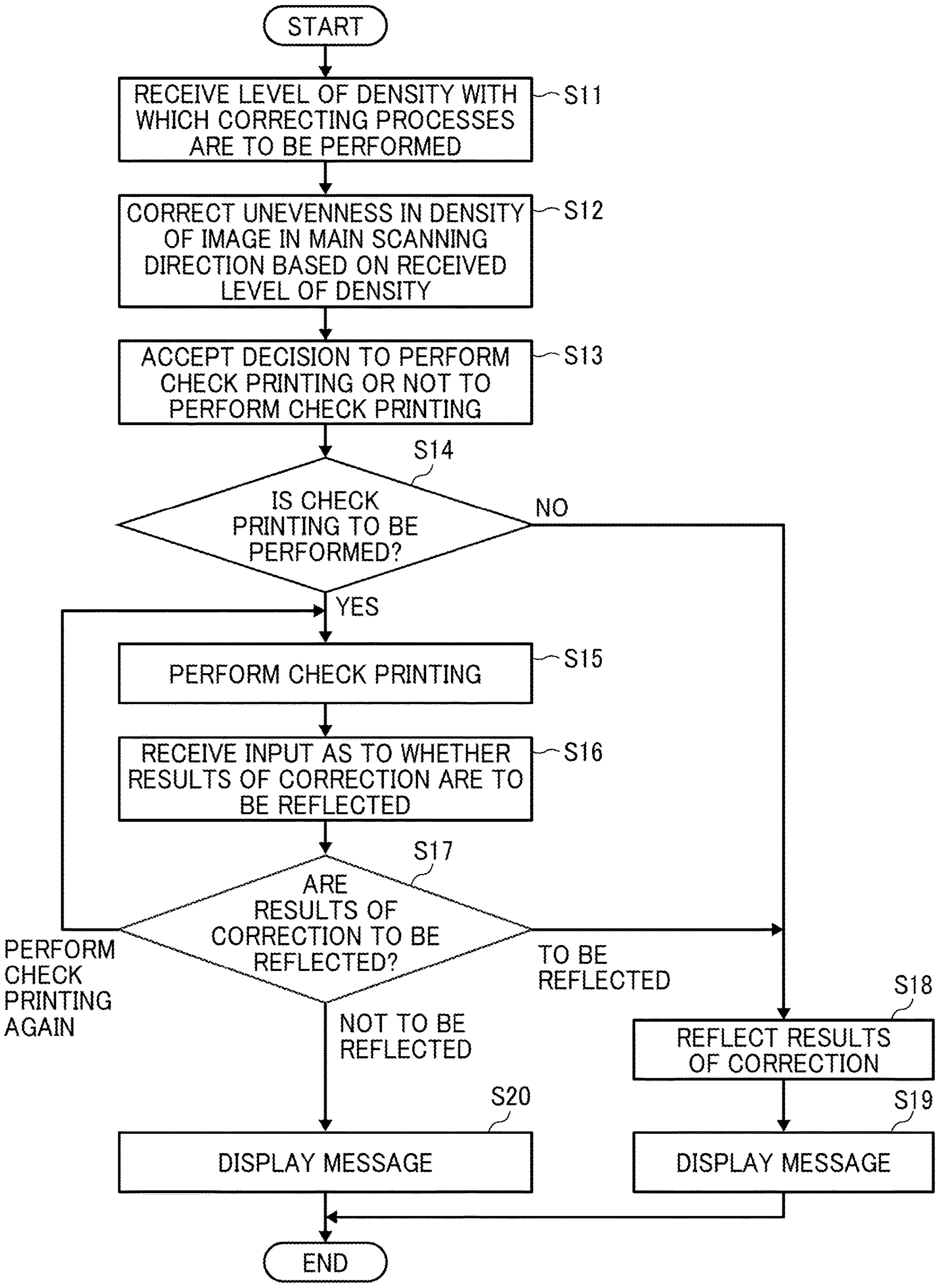
FIG. 8 is a flowchart of the unevenness-in-density correcting processes performed by the image forming apparatus of FIG. 1.

FIG. 8 is a flowchart of the unevenness-in-density correcting processes performed by the image forming apparatus 1 according to the present embodiment.

Firstly, in a step S11, the receiver 150 according to the present embodiment receives the level of density with which the unevenness-in-density correcting processes are to be performed. Upon receipt of the level of density, in a step S12, the controller 180 according to the present embodiment corrects the unevenness in the density of an image in the main scanning direction based on the received level of density. In the unevenness-in-density correcting processes according to the present embodiment, at least some of the conditions for image formation is changed or corrected such that the unevenness in the density of an image will cease. As described above, according to the present embodiment, the unevenness-in-density correcting processes for the level of density specified and input by a user are performed. Accordingly, the image quality that meets the user's demands can be achieved.

Subsequently, in a step S13, the receiver 150 according to the present embodiment accepts the decision to perform check printing or not to perform check printing. The check printing is performed such that a user can visually check the effects of the unevenness-in-density correcting processes. The user visually checks the image on the sheet that is output as a result of the performed check printing, and determines whether images are obtained as desired.

When the check printing is not to be performed in accordance with the input from a user ("NO" in the step S14), in a step S18, the controller 180 reflects the results of correction. The results of correction may be, for example, the corrected image-forming condition. Alternatively, the results of correction may be, for example, the amount of correction added to the image-forming condition when an image is to be formed. For example, the reflection of the results of correction may be implemented by storing the results of correction in the correction memory 211.

Such storage of the results of correction should not be done on a temporary basis, and it is desired that the results of correction be stored in a nonvolatile memory such as the HDD 40 where the data is not deleted even when the power of the image forming apparatus 1 is turned off. In such a configuration, the results of correction can be read at the next image formation, and an image can be formed with the corrected image-forming condition.

After the results of correction are reflected in the step S18, in a step S19, the display controller 160 controls the operation panel 60 to display, for example, a message indicating that the unevenness-in-density correcting processes are completed, and this series of processes is terminated.

Return to the step S14. When the check printing is to be performed in accordance with the input from a user ("YES" in the step S14), in a step S15, the controller 180 performs the check printing with the image-forming condition obtained as a result of the unevenness-in-density correcting processes. Then, in a step S16, the receiver 150 receives input as to whether the results of correction are to be reflected from a user who has checked the check printing.

When the input made by the user requests to reflect the results of correction, in a step S18, the controller 180 reflects the results of correction. After that, in a step S19, the display controller 160 controls the operation panel 60 to display, for example, a message indicating that the unevenness-in-density correcting processes are completed, this series of processes is terminated.

By contrast, when the input made by the user requests the controller 180 not to reflect the results of correction, in a step S20, the display controller 160 controls the operation panel 60 to display, for example, a message indicating that the process is being terminated without performing the unevenness-in-density correcting processes, and this flow of processes is terminated.

On the other hand, when the check printing is to be performed again in accordance with the input made by the user, the controller 180 returns the process to the check printing to be performed in the step S15, and performs the check printing again.

There are some cases in which the image density (ID) that is consistent with the image data cannot be obtained due to, for example, the variations in the shape or characteristics of the multiple members of the image forming apparatus 1, the changes over time, and the changes in the environment where the image forming apparatus 1 is arranged, and undesired image-density unevenness may occur. In such cases, the adjustment patterns for the unevenness in density are formed on the sheet or the intermediate transfer belt based on, for example, the image data that has a certain level of image density (ID) in the main scanning direction. Such a certain level of image density may be referred to as halftone density in the following description. Moreover, the image density (ID) of each of the multiple positions of the adjustment patterns in the main scanning direction is read to detect the unevenness in the density of an image. When the unevenness in the density of an image is detected as a result, the unevenness-in-density correcting processes are performed upon changing at least some of the conditions for image formation so as to reduce or cancel the unevenness in the density of the image.

Users who desire higher resolution wish to eliminate or reduce the unevenness in the density of an image for the level of density within a specific range. Depending on the causes of the unevenness in the density of an image, there are some cases in which the unevenness in the density of an image tends to occur at the level of density within a specific range. In order to handle such a situation, in the present embodiment, unevenness-in-density correcting processes are performed for the level of density specified by a user. Execution of such a function to correct the unevenness in density for the level of density specified by a user is not always necessary and may be omitted.

Cases in which the image-forming condition to be corrected is the exposing power of the write light by the exposure device 101, which is equivalent to the LD power or the exposure value of the exposure device 101, are described below by way of example. In such cases, for example, the difference in the LD power or the volume of the exposure value of the write light to the multiple writing positions that correspond to a plurality of positions in the main scanning direction is corrected such that the image-density unevenness will no longer be detected.

Figure 9:
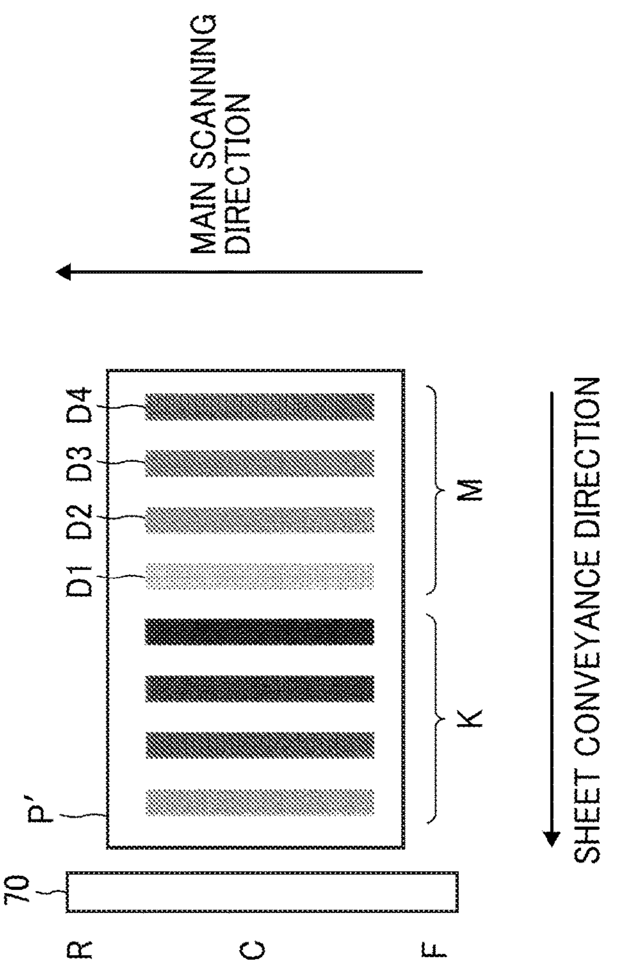
FIG. 9 is a diagram illustrating adjustment patterns for the unevenness in density, according to an embodiment of the present disclosure.

FIG. 9 is a diagram illustrating the adjustment patterns D1, D2, D3, and D4 for the unevenness in density, according to the present embodiment.

The signs R, C, and F in FIG. 9 indicate the positions in the image forming apparatus 1 in the main scanning direction. In other words, R indicates the rear side of the apparatus, and C indicates the center of the apparatus in the forward and backward directions. F indicates the front side of the apparatus. In other words, F indicates a portion of the apparatus where a user operates, for example, the operation panel 60. The same applies to the following description and the drawings.

FIG. 9 illustrates the sheet of paper P' on which the adjustment patterns have been formed, and the sheet P' is being conveyed toward the density sensor 70. Four adjustment patterns of black (K) color in which image density (ID) is different from each other and four adjustment patterns of magenta (M) color in which image density (ID) is different from each other are formed on the sheet P'. Regarding to the four adjustment patterns D1, D2, D3, and D4 of magenta (M) color, a smaller number indicates a lower density and a larger number indicates a higher density. Each one of the multiple adjustment patterns is formed so as to be even at a corresponding target image density (ID).

As illustrated in FIG. 9, the image forming apparatus 1 according to the present embodiment generates a plurality of adjustment patterns D1, D2, D3, and D4 in which the image density (ID) is different from each other for each color. Then, the writing amount of correction M(x) or the corrective value of the image-forming condition that is used to correct the unevenness in the density of an image in the main scanning direction is calculated based on the image density (ID) at the multiple positions in the main scanning direction that are detected for each one of the multiple adjustment patterns. In the present embodiment, the writing amount of correction M(x) is calculated for each one of the image densities (ID) based on the results of the detection of the image density (ID) on each one of the adjustment patterns. As a result, the amounts of correction that meet the levels of density can be obtained. Accordingly, the unevenness in density can appropriately be corrected for a plurality of levels of density. At least, the unevenness in density can appropriately be corrected for the levels of density selected from the multiple levels of density whose number corresponds to the number of adjustment patterns whose images have been formed on the sheet.

Figure 10:
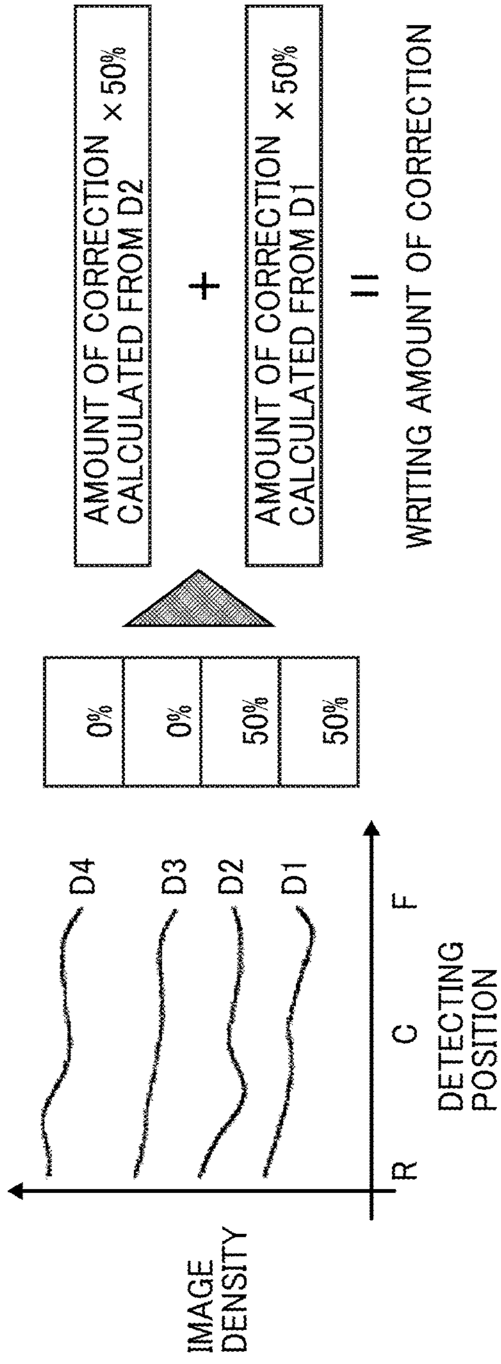
FIG. 10 is a diagram illustrating how weights are assigned in the correction of the unevenness in density, according to an embodiment of the present disclosure.

FIG. 10 is a diagram illustrating how the weights are assigned to XXX in the correction of the unevenness in density, according to the present embodiment.

In the processes of calculating the amounts of correction, weighting is performed as will be described later in detail. Accordingly, the selectable variations in the level of density can be increased.

The graph that is illustrated on the left side of FIG. 10 illustrates the results of the detection performed by the density sensor 70 on the multiple adjustment patterns D1, D2, D3, and D4 of magenta (M) color as illustrated in FIG. 9. The unevenness-in-density correcting processes are performed based on the results of the detection of the image density (ID) on the above multiple adjustment patterns whose densities are different from each other as above.

For example, the amount of correction M(x) at an optical writing position x can be calculated based on the first equation and the second equation given below. In the first equation given below, M1(x) denotes the amount of correction based on the unevenness in density of the adjustment pattern D1, and M2(x) denotes the amount of correction based on the unevenness in density of the adjustment pattern D2.

In the first equation given below, M3(x) denotes the amount of correction based on the unevenness in density of the adjustment pattern D3, and M4(x) denotes the amount of correction based on the unevenness in density of the adjustment pattern D4.

$$M(x)=M1(x)\times\alpha1+M2(x)\times\alpha2+M3(x)\times\alpha3+M4(x)\times\alpha4 \quad \text{First Equation}$$

$$\alpha1+\alpha2+\alpha3+\alpha4=1 \quad \text{Equation 2}$$

For example, when the unevenness-in-density correcting processes are performed on the difference in the level of density between the adjustment pattern D1 and the adjustment pattern D2, the multiple amounts of correction M1(x), M2(x), M3(x), and M4(x) that are calculated for the multiple adjustment patterns D1, D2, D3, and D4, respectively, are multiplied b the weighting α1, α2, α3, and α4, respectively. The resultant values are added up, and it is assumed in the present embodiment that the obtained value is the writing amount of correction M(x) of magenta (M) color for the outstanding level of density. The values for the weighting in the above case are given below by way of example. As depicted in the table in the center of FIG. 10, the weighting α1 for the adjustment pattern D1 is 50%, and the weighting α2 for the adjustment pattern D2 is 50%. Moreover, the weighting α3 for the adjustment pattern D3 and the weighting α4 for the adjustment pattern D4 is 0%. As the weighting α3 for the adjustment pattern D3 and the weighting α4 for the adjustment pattern D4 are 0%, as in the equation depicted on the right of FIG. 10, 50% of the amount of correction. M1(x) that is calculated from the adjustment pattern D1 and 50% of the amount of correction M2(x) that is calculated from the adjustment pattern D2 are added up, and it is assumed in the present embodiment that the obtained value is the writing amount of correction M(x). In other words, in the present case according to the present embodiment, the writing amount of correction M(x) for the write light of magenta (M) color is expressed in a third equation given below.

$$M(x)=0.5\times M1(x)+0.5\times M2(x) \quad \text{Third Equation}$$

Figure 11A:
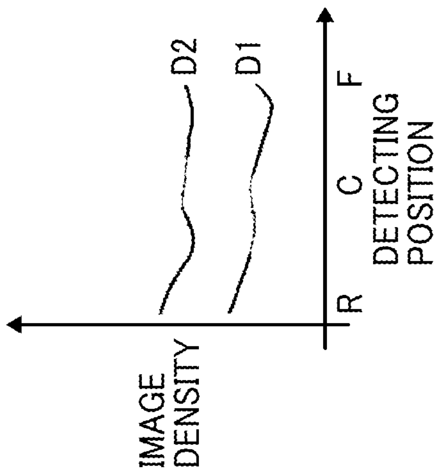
FIG. 11A is a graph illustrating the results of the detection of adjustment patterns performed by a density sensor, according to an embodiment of the present disc insure.

FIG. 11A is a graph illustrating the results of the detection of the adjustment patterns D1 and D2 performed by the density sensor 70, according to the present embodiment.

Figure 11B:
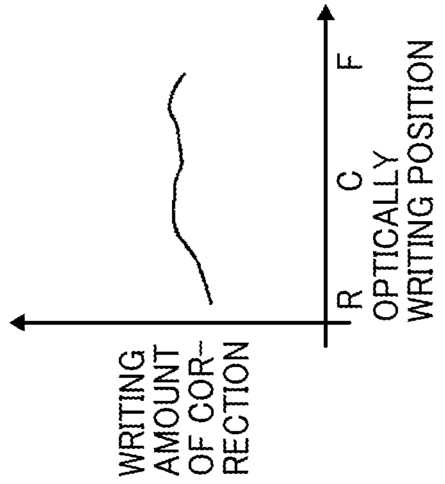
FIG. 11B is a graph of the writing amount of correction) obtained by performing the weighting on the results of the detection of the image density as illustrated in FIG. 11A, according to an embodiment of the present disclosure.

FIG. 11B is as graph of the writing amount of correction M(x) obtained by performing the weighting on the results of the detection of the image density as illustrated in FIG. 11A, according to the present embodiment.

Figure 11C:
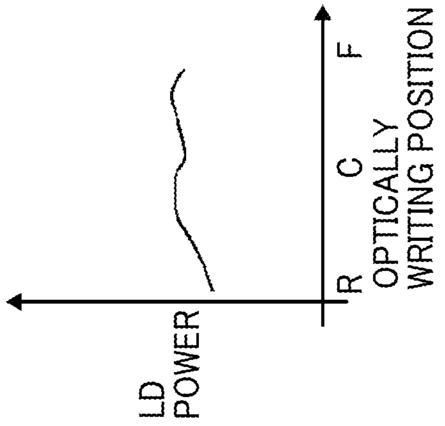
FIG. 11C is a graph of the laser diode (LD) power corrected based on the writing, amount of correction) as illustrated in FIG. 11B, according to an embodiment of the present disclosure.

FIG. 11C is a graph of the laser diode (LD) power corrected based on the writing, amount of correction (M(x)) as illustrated in FIG. 11B, according to the present embodiment.

As the writing amount of correction (M(x)) as illustrated in FIG. 11B which is calculated upon performing weighting, is used as the amount of correction for the LD power, the unevenness in the density of an image can appropriately be corrected for the difference in the level of density between the adjustment pattern D1 and the adjustment pattern D2. Accordingly, the unevenness in density of an image can be corrected with a high degree of precision upon selecting a larger number of levels of density than the four levels of density, with which the adjustment patterns are formed.

Alternatively, when the level of the density of the adjustment pattern D1 is selected for the unevenness-in-density correcting processes, 100%, 0%, 0%, and 0% are to be assigned to the weighting α1 for the adjustment pattern D1, the weighting α2 for the adjustment pattern D2 is 0%, and the weighting α3 for the adjustment pattern D3, the weighting α4 for the adjustment pattern 134, respectively. This combination of the weighting α1, α2, α3, and α4 as assigned above is determined for each one of the selectable levels of density, and is stored in the weighting memory 213 in advance.

The correction for magenta (M) color is described above, but the four adjustment patterns of black (K) color toner as illustrated in FIG. 9 can be corrected in a similar manner. For example, the adjustment patterns of cyan (C) color and yellow (Y) color may be formed on the second sheet (P) in a similar manner to the above. In other words, the correction of all colors can be performed in a similar manner. In the present embodiment, the amount of correction for the LD power or the exposure value is described by way of example. However, no limitation is indicated thereby, and the amounts of correction for the degree of modulation of the pulse-width modulation may be adopted. Alternatively, the present embodiment may be applied to, for example, cases in which the light of light-emitting diodes (LED) is used as write light.

Figure 12:
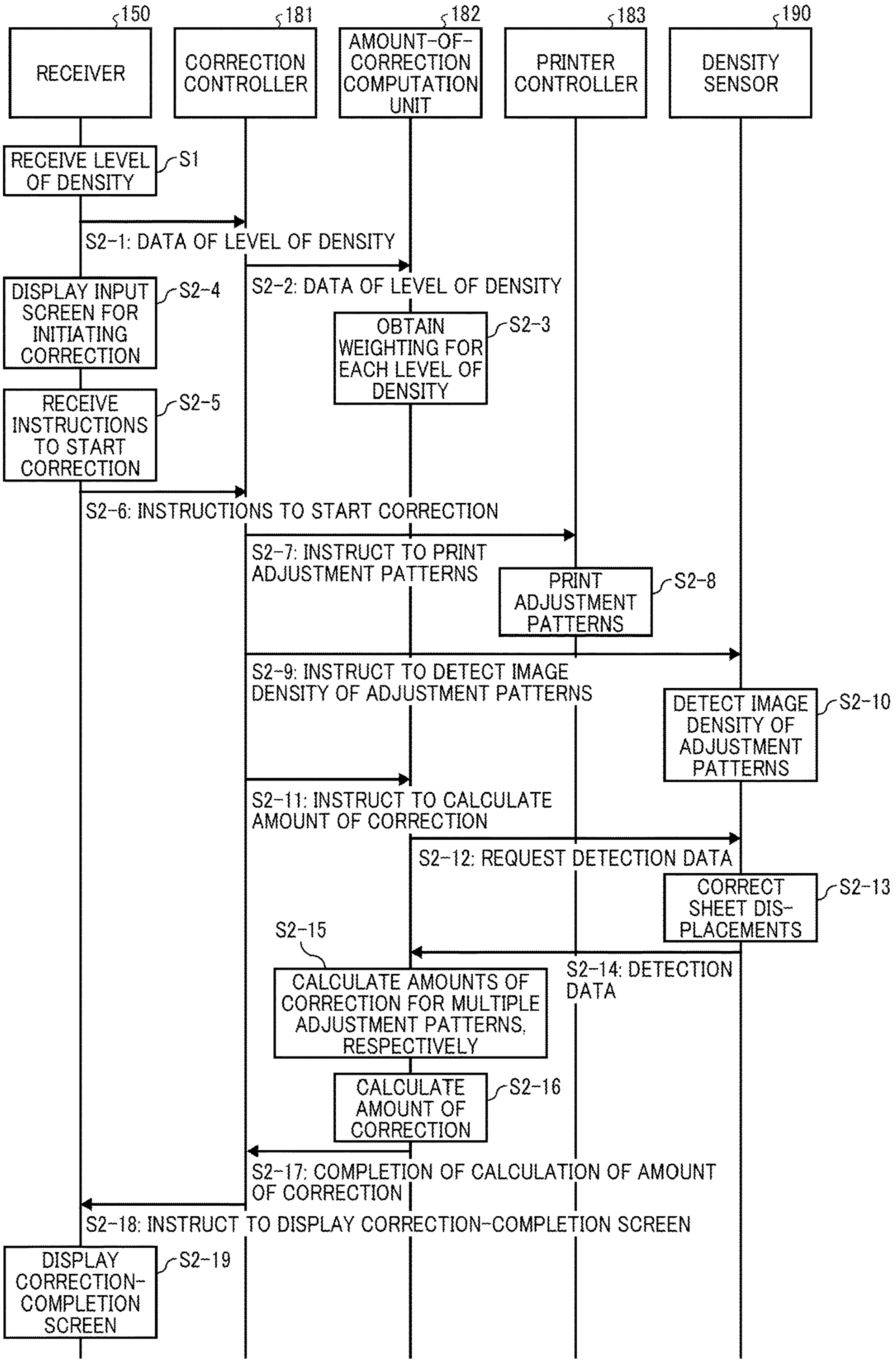
FIG. 12 is a data sequence diagram illustrating the unevenness-in-density correcting processes, according to an embodiment of the present disclosure.

FIG. 12 is a data sequence diagram illustrating the unevenness-in-density correcting processes, according to the present embodiment.

The processes in the steps S11 and S12 in the flowchart of FIG. 8 are described in detail with reference to FIG. 12.

Firstly, in a step S1, the receiver 150 according to the present embodiment receives the level of density with which the unevenness-in-density correcting processes are to be performed. The screen that is displayed to a user in the step S1 is illustrated in FIG. 13.

Figure 13:
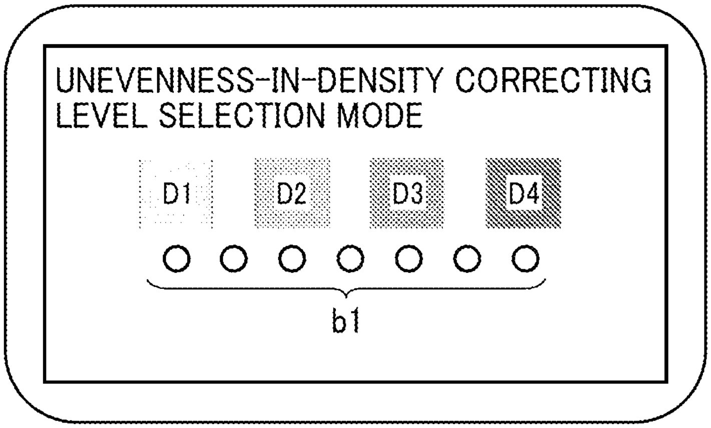
FIG. 13 is a diagram illustrating a screen on which the level of density for the unevenness-in-density correcting processes is selected, according to an embodiment of the present disclosure.

FIG. 13 is a diagram illustrating a screen on which the level of density for the unevenness-in-density correcting processes is selected, according to the present embodiment.

In FIG. 13, it is displayed on the operation panel 60 that the image forming apparatus 1 is in the unevenness-in-density correcting level selection mode. Further, multiple degrees of image density (ID) are illustrated in. FIG. 13 by way of example for the adjustment patterns D1, D2, D3, and D4 in order to assist a user to select the level of density.

As illustrated in FIG. 13, a group of selection keys hi are displayed on the operation panel 60. A key that indicates the level of density to which the image-density unevenness is to be corrected is selected from the group of selection keys b1.

Once the receiver 150 receives the level of density selected on the screen as illustrated in FIG. 13, in a step S1, the unevenness-in-density correcting processes in the step S2 of FIG. 8 are started. More specifically, once the receiver 150 according to the present embodiment receives the data of the level of density in the step S1, in a step S2-1, the data of the input level of density, is output to the correction controller 181. Subsequently, in a step S2-2, the correction controller 181 outputs the data of the lev of density to the amount-of-correction computation unit 182. In a step S2-3, the amount-of-correction computation unit 182 obtains the weighting for each one of the multiple levels of density received from the weighting memory 213. When a different level of density is selected on the panel of options to be selected as illustrated in FIG. 13, the processes in the step S2-1, the step S2-2, and the step S2-3 are repeated.

Once the receiver 150 receives the level of density with which the unevenness-in-density correcting processes are to be performed in the step S1, in a step S2-4, an input screen for initiating the correction is displayed. The processes in the steps S2-1, S2-2, and S2-3 may be performed in parallel with the processes in the step S2-4.

Figure 14:
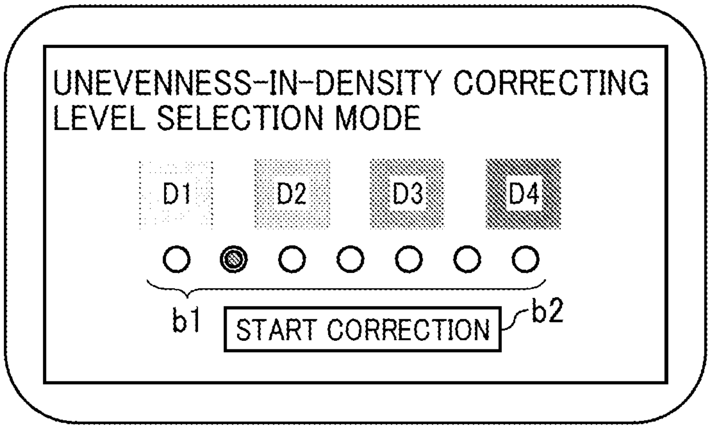
FIG. 14 is an input screen for initiating the correction, where instructions to start the correction are given, according to an embodiment of the present disclosure.

FIG. 14 is an input screen for initiating the correction, where instructions to start the correction are given, according to the present embodiment.

By way of example, the screen when a level of density between the adjustment pattern D1 and the adjustment pattern D2 is selected on the screen as illustrated in FIG. 13 is illustrated in FIG. 14. As illustrated in FIG. 14, once the density level is selected, a start key b2 for initiating the correction is displayed.

Once the start key b2 for initiating the correction is touched or pressed down on the input screen for initiating the correction as illustrated in FIG. 14, the receiver 150 according to the present embodiment receives instructions to start the correction in the step S2-5. Upon receiving the instructions to start the correction, in a step S2-6, the receiver 150 instructs the correction controller 181 to start the correction. Then, the correction controller 181 that has received the instructions to stain the correction obtains the adjustment patterns D1, D2, D3, and D4 from the pattern memory 212, and in a step S2-7, instructs the primer controller 183 to print the obtained multiple adjustment patterns D1, D2, D3, and D4.

In a step S2-8, the printer controller 183 prints the adjustment patterns D1, D2, D3, and D4 on a sheet as instructed above. Further, in a step S2-9, the correction controller 181 instructs the density detection device 190 to detect the image density of the multiple adjustment patterns printed by the primer controller 183. In a step S2-10, the density detection device 190 according to the present embodiment detects the image density of the multiple adjustment patterns D1, D2, D3, and D4.

Subsequently, in a step S2-11, the correction controller 181 instructs the amount-of-correction computation unit 182 to calculate the writing amount of correction M(x). In a step S2-12, the amount-of-correction computation unit 182 requests the density detection device 190 for the detection data that indicates the results of the detection of the image density. In a step S2-13, the density detection device 190 corrects the sheet displacements. In a step S2-14, the density detection device 190 makes a response to the amount-of-correction computation unit 182 by sending the results of correction of the sheet displacements as the detection data. The correction of the sheet displacements is described later in detail.

In a step S2-15, the amount-of-correction computation unit 182 calculates, for the multiple adjustment patterns D1, D2, D3, and D4, a plurality of amounts of correction M1(x), M2(x), M3(x), and M4(x), respectively, in which image density (ID) is different from each other, based on the detection data. More concretely, in the present embodiment, based on the detection data of the multiple adjustment patterns D1, D2, D3, and D4, the multiple amounts of correction M1(x), M2(x), M3(x), and M4(x) is calculated using the sh sensitivity that serves as the relational value. The method of calculating each one of the multiple amounts of correction M1(x), M2(x), M3(x), and M4(x) will be described later in detail. Subsequently, in a step S2-16, the amount-of-correction computation unit 182 calculates the amount of correction M(x) that corresponds to the information about the level of density, based on the multiple degrees of the weighting $\alpha 1$, $\alpha 2$, $\alpha 3$, and $\alpha 4$ obtained in the step S2-3 and the multiple amounts of correction M1(x), M2(x), M3(x), and M4(x).

In a step S2-17, the amount-of-correction computation unit 182 notifies the correction controller 181 of the completion of the calculation of the amount of correction. In a step S2-18, the correction controller 181 instructs the receiver 150 to display a correction-completion screen through the display controller 160. Upon receipt of the instructions to display the correction-completion screen, in a step S2-19, the receiver 150 according to the present embodiment displays the correction-completion screen.

Figure 15:
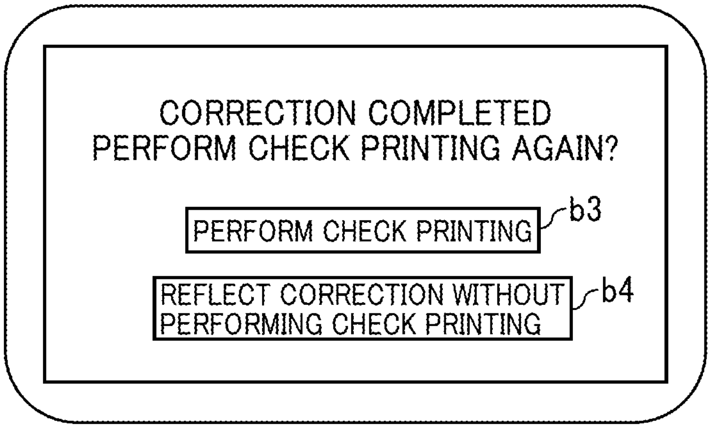
FIG. 15 is a diagram illustrating a correction-completion screen according to an embodiment of the present disclosure.

FIG. 15 is a diagram illustrating a correction-completion screen according to the present embodiment.

On the operation panel 60, a message saying "CORRECTION COMPLETED" is displayed to the user. Moreover, a message saying "PERFORM CHECK PRINTING AGAIN?" is displayed on the operation panel 60. A key, b3 is to be touched or pressed down to choose to perform check printing. Alternatively, a key b4 is to be touched or pressed down to choose not to perform check printing. Due to such a configuration, the screen in FIG. 15 may also serve as a screen through which whether the check printing is to be performed is selected.

Figure 16:
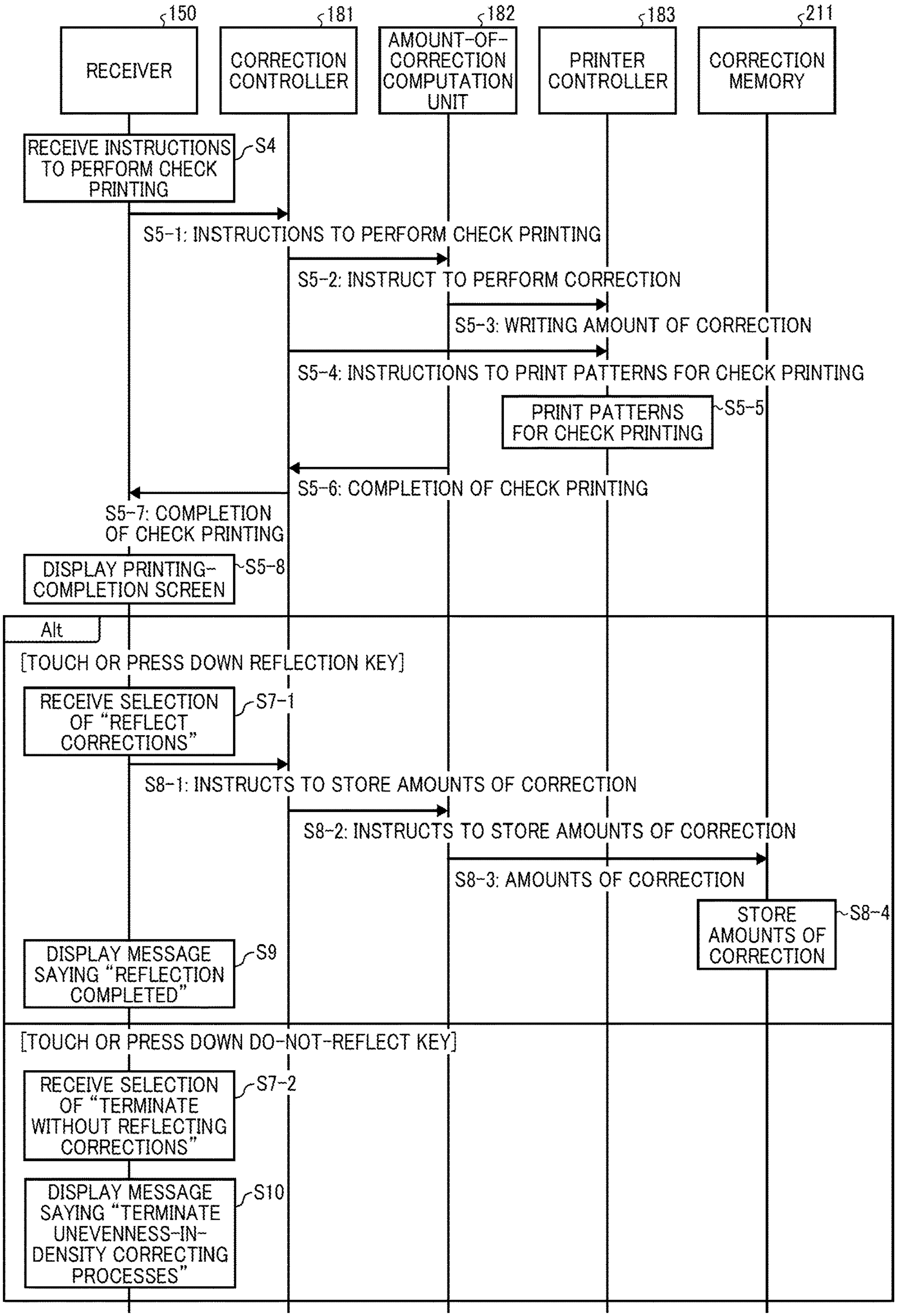
FIG. 16 is a data sequence diagram illustrating the processes of reflecting corrections, according to an embodiment of the present disclosure.

FIG. 16 is a data sequence diagram illustrating the processes of reflecting corrections, according to the present embodiment.

The processes in the step S4 to the step S10 when the correction is to be reflected and when the correction is not to be reflected in the step S7 of the flowchart as illustrated in FIG. 8 are described in detail with reference to FIG. 16.

Firstly, when a key b3 is selected on the screen as illustrated in FIG. 15, in a step S4, the receiver 150 according to the present embodiment receives the instructions to perform check printing. Subsequently, in a step S5-1, the receiver 150 instructs the correction controller 181 to perform the check printing. In a step S5-2, the correction controller 181 that has received the instructions to perform the check printing instructs the amount-of-correction computation unit 182 to perform the correction.

In a step S5-3, the amount-of-correction computation unit 182 that has received the instructions to perform the correction sends the writing amount of correction M(x) to the printer controller 183. Further, the amount-of-correction computation unit 182 obtains patterns for check printing from the pattern memory 212, and in a step S5-4, the printer controller 183 is instructed to print the patterns for check printing where the LID power is corrected with the writing amount of correction M(x). The patterns for check printing may be equivalent to the adjustment patterns or may be different from the adjustment patterns.

In a step S5-5, the primer controller 183 prints the patterns for check printing. Once the check printing is completed, in a step S5-6, the amount-of-correction computation unit 182 notifies the correction controller 181 of the completion. Upon receipt of the notification, in a step S5-8, the correction controller 181 controls the display to display a printing-completion screen on the receiver 150 as operated by the display controller 160. The processes in the step S5-6 may be performed as soon as the printing instruction in the step S5-4 is made without waiting for the completion at the image formation on the sheet.

Figure 17:
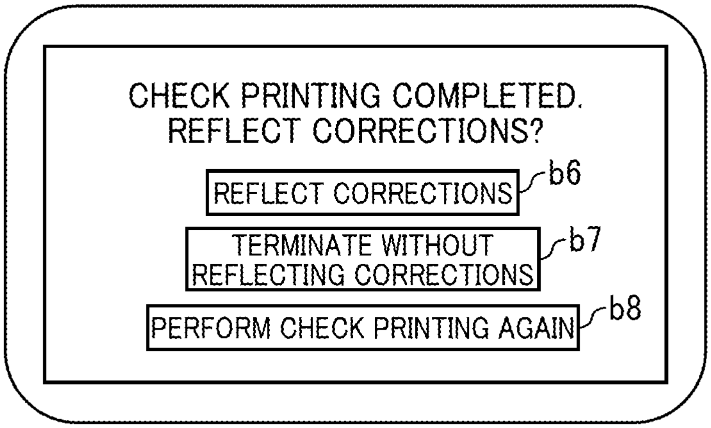
FIG. 17 is a diagram illustrating a check-printing completion screen according to an embodiment of the present disclosure.

FIG. 17 is a diagram illustrating a check-printing completion screen according to the present embodiment.

On the operation panel 60, a message saying "CHECK PRINTING COMPLETED" is displayed to the user. Moreover, a message saying "REFLECT CORRECTIONS?" is displayed on the operation panel 60, and such a message asks the user to determine whether or not to reflect the corrections.

A user checks, for example, the image quality on the check printing, and a key b6 is touched or pressed down when he or she is satisfied. A key b7 is touched or pressed down when he or she is not satisfied. By so doing, whether or not to reflect the correction can be selected. When the check printing is to be performed again, a key b8 is to be touched or pressed down. By so doing, the process returns to the step S5 of FIG. 8, and the check printing can be performed again. Due to such a configuration, the screen in FIG. 17 may also serve as a screen through which whether the correction is to be reflected is selected.

On the other hand, once the key b6 as illustrated in FIG. 17 is touched or pressed down in a step S7-1, in a step S8-1, the receiver 150 instructs the correction controller 181 to store the amounts of correction M1(x), M2(x), M3(x), and M4(x). In a step S8-2, the correction controller 181 instructs the amount-of-correction computation unit 182 to store the amounts of correction M1(x), M2(x), M3(x), and M4(x). In a step S8-3, the amount-of-correction computation unit 182 sends the amounts of correction M1(x), M2(x), M3(x) and M4(x) to the correction memory 211. In a step S8-4, the correction memory 211 stores the received amounts of correction M1(x), M2(x), M3(x), and M4(x). Subsequently, in a step S9, the receiver 150 controls the operation panel 60 to display a message saying "reflection completed," and this flow of processes is terminated.

On the other hand, once the key b7 as illustrated FIG. 17 is touched or pressed down in a step S7-2, in a step S10, the receiver 150 according to the present embodiment controls the operation panel 60 to display a message saying "terminate unevenness-in-density correcting processes," and this flow of processes is terminated.

The correction of the sheet displacements in the step S2-13 of FIG. 12 is described below in detail.

Firstly, the sheet displacements are described with reference to FIG. 18A and FIG. 18B.

Figure 18A:
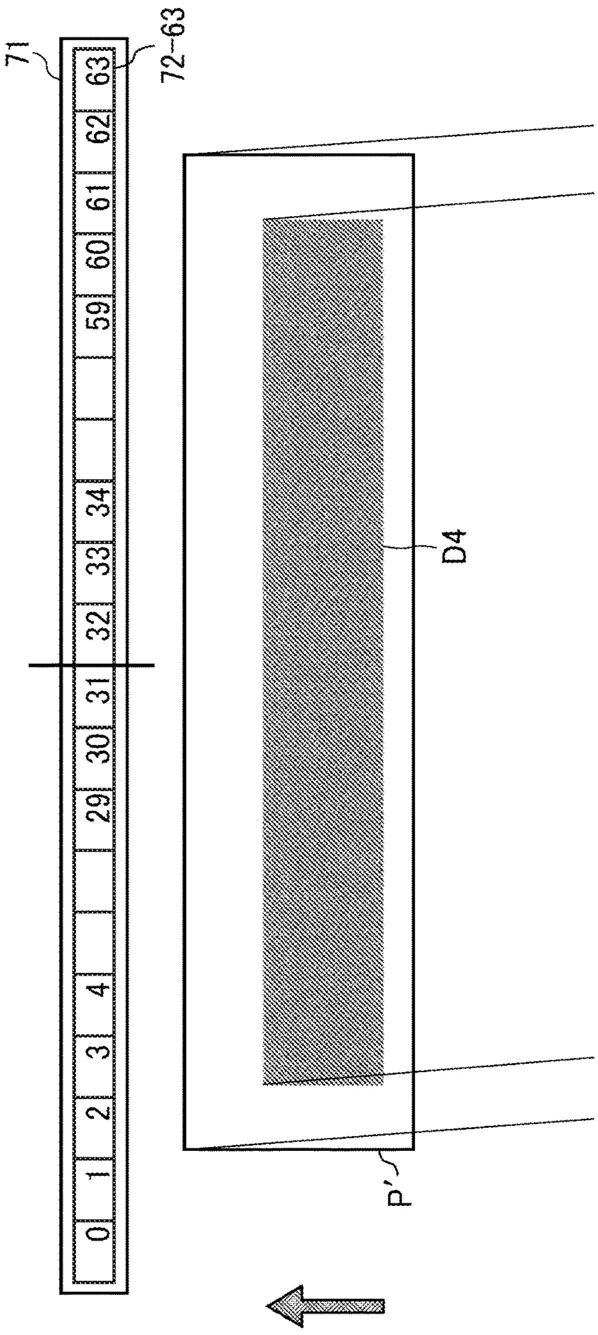
FIG. 18A and FIG. 18B are diagrams each illustrating sheet displacements according to an embodiment of the present disclosure.
Figure 18B:
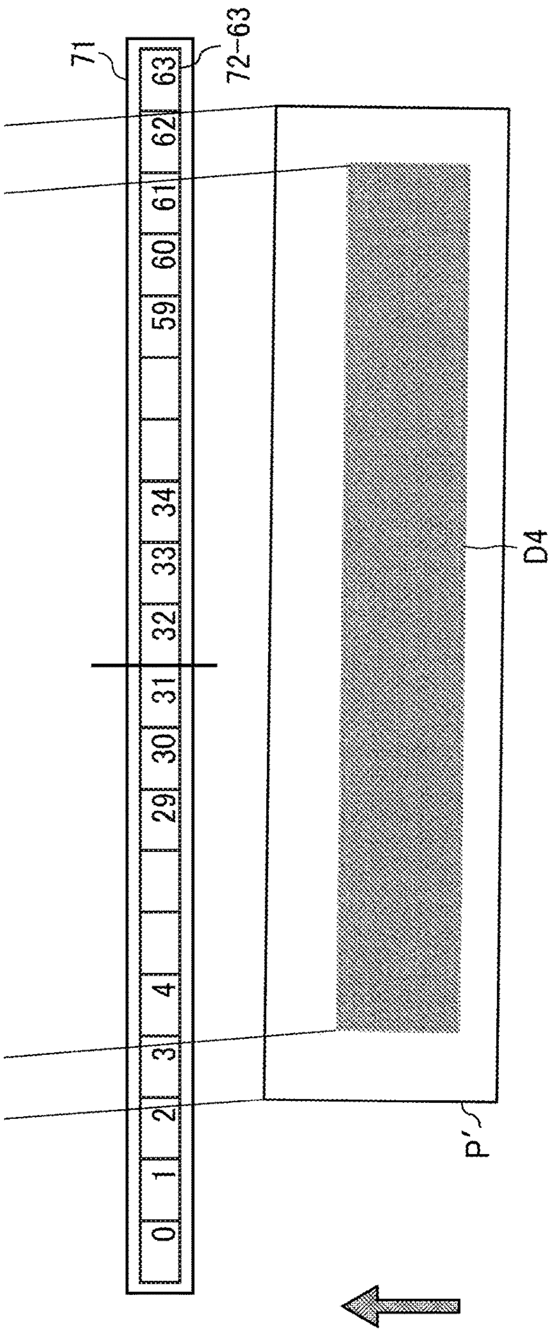

In FIG. 18A and FIG. 18B, the sheet P' is conveyed toward the imaging device 71 of the density sensor 70 as indicated by arrows. In FIG. 18A and FIG. 18B, only a portion of the sheet P' in which the adjustment pattern D4 is formed is illustrated.

As described above, the multiple photoreceptors 72 are arranged on the imaging device 71. More specifically, as illustrated in FIG. 18A and FIG. 18B, sixty-four photoreceptors 72-0 to 72-63 are aligned M a row on the imaging device 71 in the main scanning direction from the left to the right of FIG. 18A and FIG. 18B.

FIG. 18A illustrates a case in which no sheet displacements are present, according to the present embodiment. Ideally, as illustrated in FIG. 18A, the midpoint of the adjustment pattern D4 in the main scanning direction approximately matches the midpoint between the photoreceptor 72-31 and the photoreceptor 72-32, indicated by a bold line in FIG. 18A. In such cases, the midpoint of the adjustment pattern D4 approximately matches the midpoint of the detectable width of the density sensor 70 in the main scanning direction.

However, there are some cases in which the sheet P' is conveyed upon being displaced in the main scanning direction while the sheet starts from the secondary transfer position F and reaches a point facing the density sensor 70. By way of example, FIG. 18B illustrates a case in which sheet displacements are present on the right side toward the photoreceptor 72 with a suffix of a greater number, according to the present embodiment. Under the ideal condition as illustrated in FIG. 18A, the right end of the adjustment pattern D4 passes through the midpoint between the photoreceptor 72-60 and the photoreceptor 72-61. By contrast, under a condition as illustrated in FIG. 18B, the right and of the adjustment pattern D4 passes through somewhere between the photoreceptor 72-61 and the photoreceptor 72-62 due to the sheet displacements.

Due to the sheet displacements, if the image density on the adjustment pattern on the sheet P' under the condition as illustrated in FIG. 18B is detected, the position of the adjustment pattern in the main scanning direction where image formation with, for example, optical writing is actually performed is displaced from the position of the image density (ID) detected by the density sensor 70 in the main scanning direction.

Figure 19A:
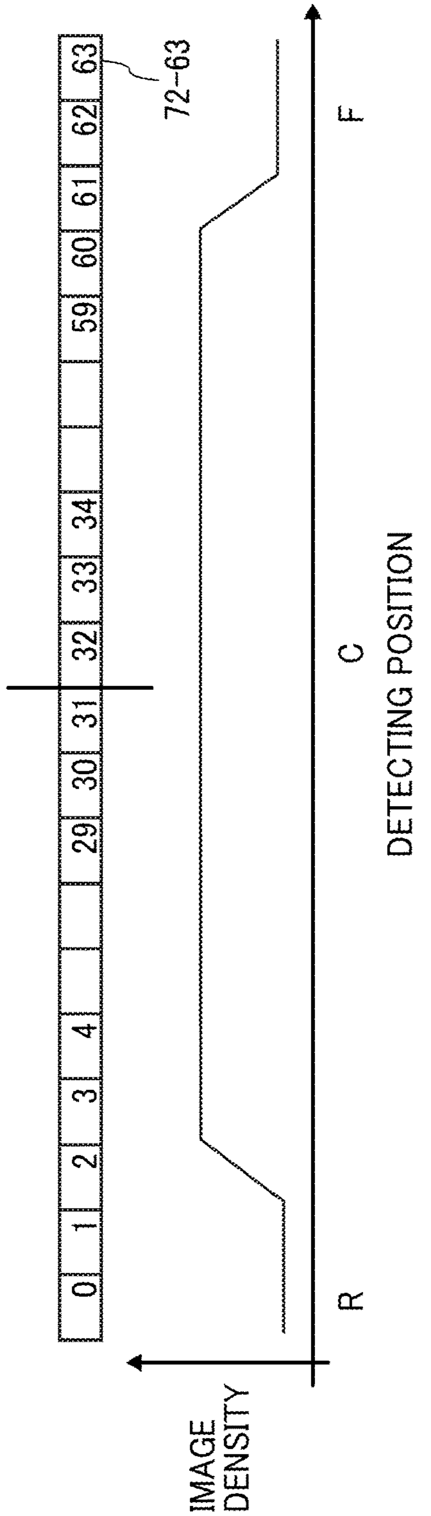
FIG. 19A and FIG. 19B are graphs each illustrating the results of the detection of the image density when sheet displacements are present, according to an embodiment of the present disclosure.
Figure 19B:
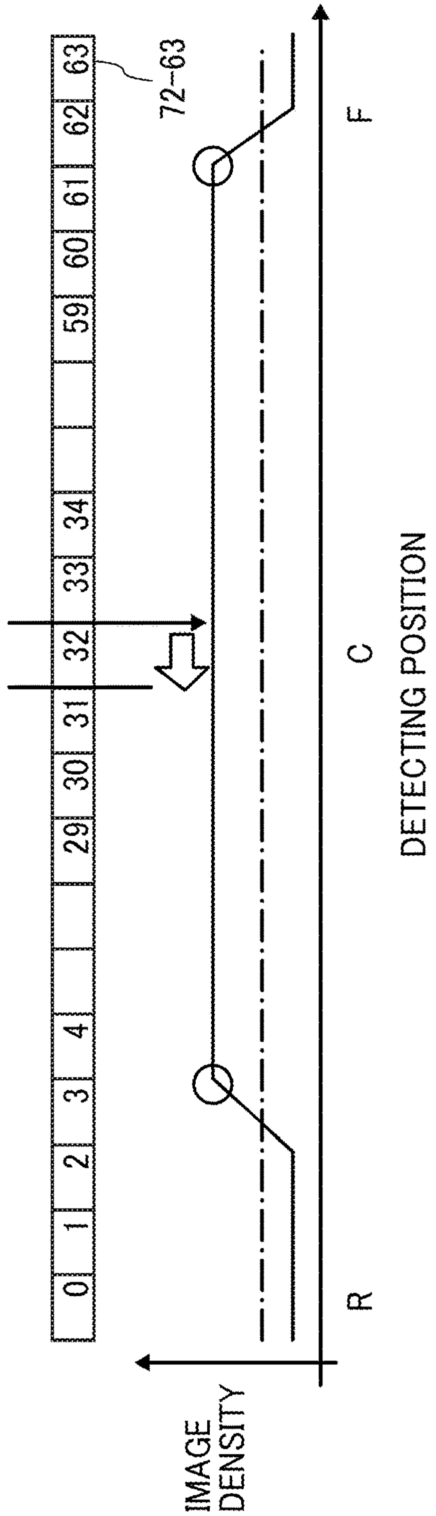

FIG. 19A and FIG. 19B are graphs each illustrating the results of the detection of the image density when sheet displacements are present, according to the present embodiment.

FIG. 19A and FIG. 19B correspond to the cases of FIG. 18A and FIG. 18B, respectively, and illustrate the image density (ID) detected by the density sensor 70, according to the present embodiment. It is assumed that unevenness in density on the adjustment pattern D4 is so small or not present at all and is not detected in the results of the detection of the image density (ID).

The graph of FIG. 19B indicates the results of the detection of the image density in which the position in the main scanning direction at which the image formation is performed is displaced from the position of the image density (ID) detected by the density sensor 70 in the main scanning direction. In other words, when sheet displacements are not present, as illustrated in FIG. 19A, the image densities (ID) of the correction pattern D4 are detected by the photoreceptors 72-2 to 72-61. By contrast, when sheet displacements occur, as illustrated in FIG. 19B, the image densities (ID) of the correction pattern D4 are detected by the photoreceptors 72-3 to 72-62. Accordingly, if the unevenness-in-density correcting processes are performed based on the results of the detection where sheet displacements are present as illustrated in FIG. 19B, correction cannot appropriately be performed.

In order to handle such a situation, the density detection device 190 according to the present embodiment determines whether sheet displacements are present. When it is determined that sheet displacements are present, the density detection device 190 corrects the position in the main scanning direction on the results of the detection of the image density (ID), and outputs the corrected results of the detection.

Figure 20:
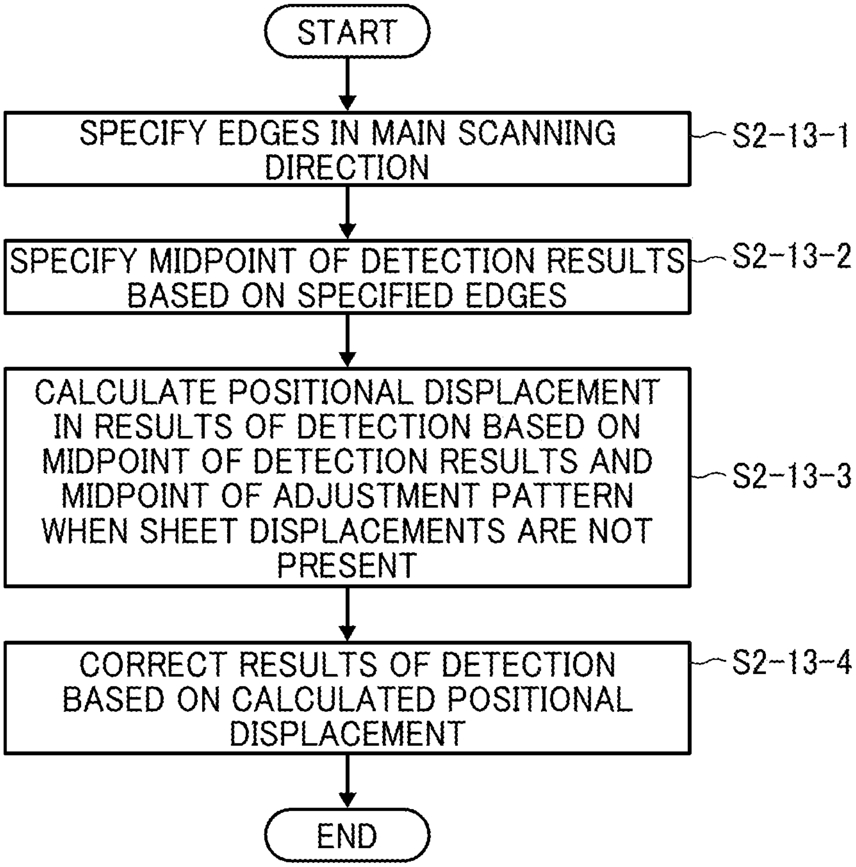
FIG. 20 is a flowchart of the processes of correcting the sheet displacements, according to an embodiment of the present disclosure.

FIG. 20 is a flowchart of the processes of correcting the sheet displacements, according to the present embodiment.

Firstly, the sheet displacement corrector 192 according to the present embodiment computes the image density (ID) at each position of the multiple photoreceptors 72 based on the signal sent from the sensor 191, and in a step S2-13-1, specifies the edges in the main scanning direction based on the computed image density (ID). More specifically, when the image density (ID) has, for example, the levels of gradation from 0 to 255, a threshold for being an edge is determined to be 100 in advance as indicated by a dot-and-dash line in FIG. 19B, and such a threshold is stored in, for example, the memory 210. Such a threshold is a value with a higher probability to appear at an edge of the adjustment pattern D4. In particular, it is determined in the results of the detection that each one of a couple of points including a point at which the density increases from a low density to a high density exceeding the threshold for being an edge in the main scanning direction and a point at which the density decreases from a high density to a low density going across the threshold for being an edge in the main scanning direction is an edge of the adjustment pattern. Such a couple of points are indicated by a couple of small circles in FIG. 19B.

Subsequently, in a step S2-13-2, the sheet displacement corrector 192 specifies the midpoint of the detection results, which is the midpoint calculated according to the detection results, based on the position of the edge determined in the results of the detection as above. In the case of FIG. 19B, the point indicated by a black arrow in the distribution of image density is the midpoint of the detection results. In other words, somewhere between the photoreceptor 72-32 and the photoreceptor 72-33 in the density sensor 70 is the midpoint of the detection results.

Subsequently, in a step S2-13-3, the sheet displacement corrector 192 according to the present embodiment calculates the positional displacement in the results of detection based on the midpoint of the detection results and the midpoint of the adjustment pattern D4 when sheet displacements are not present. More specifically, when sheet displacements are not present, at what point of the multiple photoreceptors 72 the center of the adjustment pattern, which is the midpoint of the adjustment pattern D4, is located is stored in, for example, the memory 210 in advance. In other words, in the cases of FIG. 19A and FIG. 19B, the data indicating that the center of the adjustment pattern is located between the photoreceptor 72-31 and the photoreceptor 72-32 is stored in, for example, the memory 210 in advance. Then, the center of the adjustment pattern as obtained above is compared with somewhere between the photoreceptor 72-32 and the photoreceptor 72-33, which is the midpoint of the detection results. As a result, in this case, it can be determined that the sheet P' is displaced toward the right in FIG. 19B by the width of one detectable area of the multiple photoreceptors 72.

Subsequently, in a step S2-13-4, the sheet displacement corrector 192 corrects the results of the detection based on the calculated size of displacements of the image density (ID). In other words, the multiple image densities (ID) that are received by the multiple photoreceptors 72 are regarded as the image densities (ID) detected by the multiple photoreceptors 72 that are displaced toward the right in FIG. 19B by approximately one detectable width, and the results of the detection are corrected. Finally, the sheet displacement corrector 192 outputs the detection data in which the sheet displacements have been corrected as described above to the amount-of-correction computation unit 182 as the results of the detection. Before the detection data is output, the detection data may be stored in the output circuit 75 on a temporary basis.

In the above-described correction of the sheet displacements, cases are described in which the midpoint of each one of the multiple adjustment patterns matches the midpoint of the detection width of the density sensor 70 when sheet displacements are not present. However, no limitation is intended thereby. In other words, when sheet displacements are not present, the midpoint of each one of the multiple adjustment patterns may match the point other than the midpoint of the detection width of the density sensor 70.

In the above-described correction of the sheet displacements, the point when sheet displacements are not present is preliminarily stored with respect to the midpoint of each one of the multiple adjustment patterns, and whether any sheet displacements are present is determined based on the comparison made between the preliminarily stored point and the point in the results of the detection. However, no limitation is intended thereby, and the point to be compared with may be any, predetermined point. In other words, comparison may be made with an edge of the multiple adjustment patterns. Alternatively, patterns for determining whether sheet displacements are present may be formed in an independent manner when the images of the adjustment patterns are formed, and a comparison may be made with at least one position in the above patterns. Further, the image of patterns for determining whether sheet displacements are present may be formed as part of the adjustment pattern, and a comparison may be made with at least one position in the above patterns.

How the multiple amounts of correction M1(x), M2(x), M3(x), and M4(x) that correspond to the multiple adjustment patterns D1, D2, D3, and D4 in which the image density (ID) is different from each other, respectively, are calculated and obtained in the step S2-15 as depicted in FIG. 12 will be described below in detail.

In the following description of the present disclosure, the adjustment pattern D4, which is one of the four adjustment patterns D1, D2, D3, and D4 in which image density (ID) is different from each other, is described by way of example. The same applies to the other adjustment patterns D1, D2, and D3.

Figure 21:
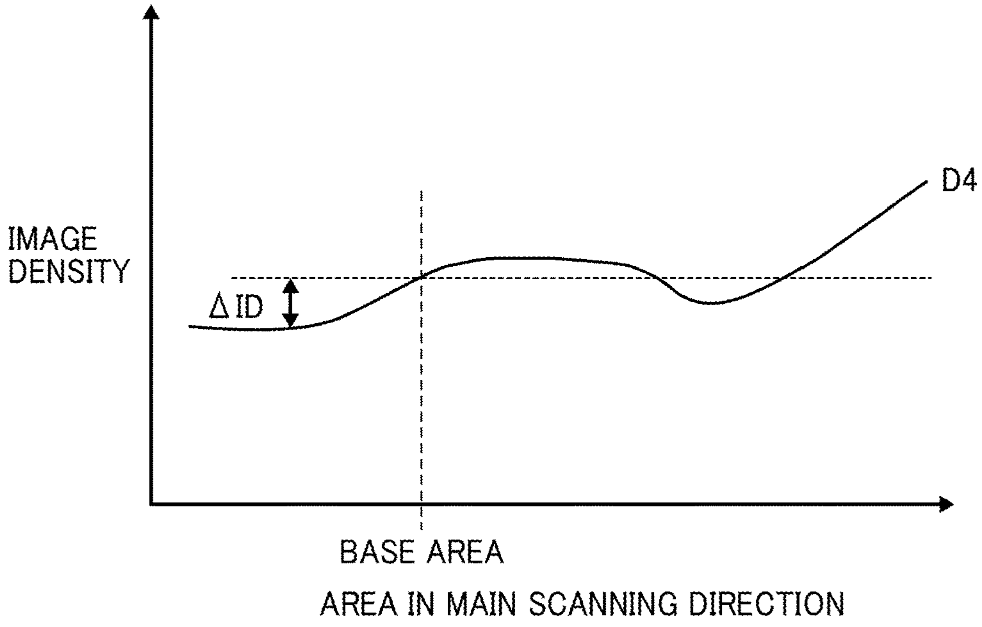
FIG. 21 is a graph illustrating the results of the detection of the image density of an adjustment pattern, according to an embodiment of the present disclosure.

FIG. 21 is a graph illustrating the results of the detection of the image density (ID) of the adjustment pattern D4, according to the present embodiment.

When the amount of correction M4(x) that corresponds to the adjustment pattern D4 is to be calculated and obtained, as described above, the amount-of-correction computation unit 182 according to the present embodiment calculates, using the sh sensitivity that serves as the relational value, the amount of correction M4(x) based on the detection data of the adjustment pattern D4 as illustrated in FIG. 21.

In the present embodiment, the amount-of-correction computation unit 182 divides the detection data of the adjustment pattern D4 into a predetermined number of areas in the main scanning direction, and calculates the amount of correction M4(x) for each one of the multiple areas in the main scanning direction or the positions in the width direction of the image. Accordingly, when the area in the main scanning direction is to be divided into sixty-four areas in design, the amounts of correction M4(x0) to M4(x63) are calculated for the sixty-four areas, respectively. In the graph of FIG. 21, the horizontal axis indicates the area numbers 0 to 63 that correspond to the multiple areas in the main scanning direction, and the vertical axis indicates the value of the image density in the detection data of the adjustment pattern D4.

In the present embodiment, the number of items of data of the adjustment pattern D4 in the main scanning direction is sixty-four equal to the number of the photoreceptors 72-0 to 72-63. Accordingly, in the present embodiment, the area in the main scanning direction is divided into sixty-four areas in the design. However, the number of areas in the main scanning direction is not limited to sixty-four. In other words, the number of the areas in the main scanning direction may be greater or smaller than sixty-four, i.e., the number of items of the data of the adjustment pattern D4 in the main scanning direction.

Figure 22:
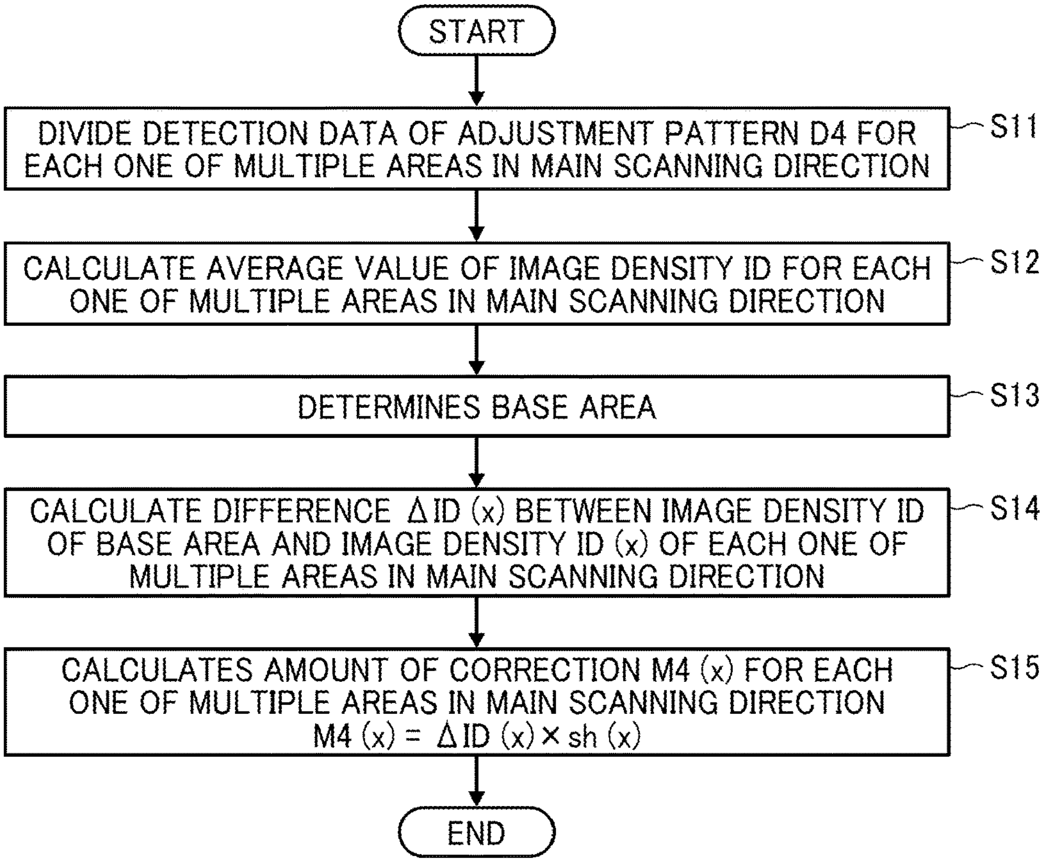
FIG. 22 is a flowchart of the processes of calculating an amount of correction) that corresponds to the adjustment pattern of FIG. 21, according to an embodiment of the present disclosure.

FIG. 22 is a flowchart of the processes of calculating an amount of correction M4(x) that corresponds to the adjustment pattern D4, according to the present embodiment.

In the present embodiment, in a step S11, the amount-of-correction computation unit 182 divides the detection data of the adjustment pattern D4 for each one of the multiple areas in the main scanning direction upon obtaining the detection data of the adjustment pattern D4 from the density detection deice 190 in the step S2-14. Subsequently, in a step S12, the amount-of-correction computation unit 182 calculates the average value of the image density (ID) for each one of the multiple areas in the main scanning direction, and determines that the multiple calculated average values are the image densities ID of the multiple areas in the main scanning direction, respectively. In the present embodiment, the number of areas in the main scanning direction matches the number of items of data of the adjustment pattern D4 in the main scanning direction, which is equivalent to the number of the photoreceptors 72-0 to 72-63. Accordingly, the average value of the image density (ID) for the multiple areas the main scanning direction is equivalent to the average value of the image density (ID) for the multiple areas in the sub-scanning direction.

Subsequently, in a step S13, the amount-of-correction computation unit 182 determines the multiple base areas in the main scanning direction based on predetermined conditions for selection. For example, under such predetermined conditions for selection, the multiple areas in the main scanning direction are selected that have the image density ID closest to the average value of the image density ID(x) for the multiple areas in the main scanning direction.

Once the base area is selected and determined as described above, in a step S14, the amount-of-correction computation unit 182 calculates, for each one of the multiple areas in the main scanning direction, a difference ΔID(x) between the imago density ID of the base area and the image density ID(x) of each one of the multiple areas in the main scanning direction.

If the image density (ID) of each one of the multiple areas in the main scanning direction is corrected such that each one of the difference ΔID(x) between each pair of the multiple areas in the main scanning direction will be zero, the image density ID of all of the multiple areas in the main, scanning direction matches the image density ID of the base area, and the unevenness in the density of an image in the main scanning direction is corrected. In the present embodiment, the LD power or the exposure value of the exposure device 101, which is one of the conditions for image formation, is changed, and the image density (ID) of each one of the multiple areas in the main scanning direction is corrected such that each one of the difference ΔID(x) between each pair of the multiple areas in the main scanning direction will be zero. In order to achieve such functions, the difference ΔID(x) between each pair of the multiple areas in the main scanning direction needs to be converted into the amount of correction M(x) for the LD power or the exposure value, which corresponds to the corrective value of the image-forming condition. As the parameter for the above conversion, in the present embodiment, the sh sensitivity that serves as the relational value is used.

In the present specific embodiment, when the same sh sensitivity is used constantly for the difference ΔID(x) of each one of the multiple areas in the main scanning direction to calculate the amount of correction M4(x) for each one of the multiple areas in the main scanning direction, the image-density unevenness cannot sufficiently be corrected. This is because the relation between the difference ΔID or the unevenness-in-density corrective value and the amount of correction or the corrective value of the image-forming condition in the main scanning direction is not constant and the relation is different among the multiple areas in the main scanning direction.

When the relation is different among the multiple areas in the main scanning direction, the writing amount of correction M(x) cannot appropriately be calculated at the position in the main scanning direction that has a relation different from the above relation. As a result, there are some cases in which the unevenness in the density of an image cannot sufficiently be corrected.

In order to avoid such a situation, in the present embodiment, appropriate sh sensitivity sh(x) is calculated for each one of the sixty-four areas x in the main scanning direction, where x denotes one of the numbers 0 to 63, and the sh sensitivity for each one of the multiple areas in the main scanning direction is stored in the correction memory 211 of the memory 210. The sh sensitivity (sh(x)) for each one of those multiple areas in the main scanning direction may be stored in the correction memory 211 when the image forming apparatus 1 according to the present embodiment is manufactured or is to be shipped, or may be stored in the correction memory 211 after sales.

Subsequently, in a step S15, the amount-of-correction computation unit 182 multiplies the difference ΔID(x) of each one of the multiple areas in the main scanning direction by the sh sensitivity sh(x) that corresponds to each one of the multiple areas in the main scanning direction, to calculate an amount of correction M4(x) for each One of the multiple areas in the main scanning direction. Due to such as configuration, the amount of correction M4(x) that is calculated for each one of the multiple areas in the main scanning direction gets close to an appropriate corrective value compared with when the same sh sensitivity is used constantly for the difference ΔID(x) of each one of the multiple areas in the main scanning direction or the image-width direction. Accordingly, the unevenness in density of an image in the main scanning direction can be corrected to a sufficient degree.

Figure 23:
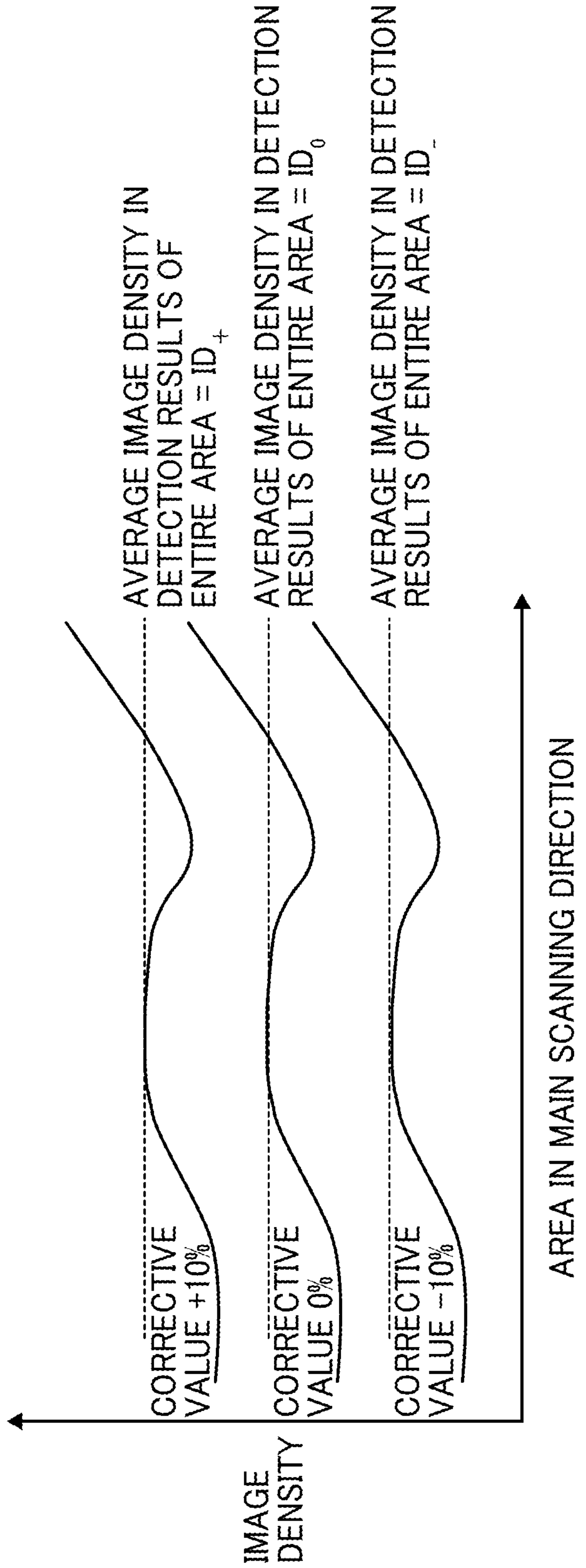
FIG. 23 is a graph illustrating a method of calculating the sh sensitivity in each one of multiple areas in the main scanning direction, according to an embodiment of the present disclosure.

FIG. 23 is a graph illustrating a method of calculating the sh sensitivity in each one of the multiple areas in the main scanning direction, according to the present embodiment.

The difference ΔID that corresponds to the unevenness-in-density corrective value is approximately proportionate to the amount of correction that corresponds to the corrective value of the image-forming condition, and the sh sensitivity that indicates the above proportionate relation can be expressed in factor of proportionality.

In view of such circumstances, for example, three adjustment patterns similar to the above multiple adjustment patterns D1, D2, D3, and D4 may be generated, and the image density (ID) of each one of the above three adjustment patterns may be detected by the density sensor 70. These three adjustment patterns are sufficient as long as each of these adjustment patterns is with different image density (ID). In the present specific embodiment, one of the above three adjustment patterns is made equivalent to the adjustment pattern D4 where the amount of correction is 0% so as to be consistent with the above-described embodiment. For the remaining two adjustment patterns, the pattern that is generated by correcting the LD power of the adjustment pattern D4 with the amount of correction of +10% and the pattern that is generated by correcting the LD power of the adjustment pattern D4 with the amount of correction of −10% are used.

When the sh sensitivity (sh(x)) for each one of the multiple areas in the main scanning direction is to be calculated, the detection data of the above three patterns is divided for each one of the multiple areas in the main scanning direction. Subsequently, the average value of the image density (ID) of the above three patterns is calculated for each one of the multiple areas in the main scanning direction, and it is determined that the multiple calculated average values are the image densities ID of the multiple areas in the main scanning direction, respectively. In the present embodiment, it is assumed that the image density (ID) of each one of the multiple areas in the main scanning direction in the pattern where the amount of correction is 0% $ID_0(x)$. Moreover, it is assumed that the image density (ID) of each one of the multiple areas in the main scanning direction in the pattern where the amount of correction is +10% and the image density (ID) of each one of the multiple areas in the main scanning direction in the pattern where the amount of correction is −10% are $ID_+(x)$ and $ID_-(x)$, respectively.

Then, the image density $ID_0(x)$, $ID_+(x)$, and $ID_-(x)$ of the multiple areas in the main scanning direction in the three patterns are used, and the she sensitivity (sh(x)) is calculated for each one of the multiple areas in the main scanning direction based on a fourth equation given below.

$$\begin{aligned} sh(x) &= \text{Amount of Correction}\,[\%]/\Delta ID(x) \qquad \text{Fourth Equation} \\ &= \{(10\% - 0\%) + (0\% - (-10\%)\}/ \\ &\quad \{ID_+(x) - ID_0(x)) + (ID_0(x) - ID_-(x))\} \end{aligned}$$

In the present embodiment, the sh sensitivity sh(x) is calculated for each one of the multiple portions in the image-width direction that correspond to the sixty-four areas in the main scanning direction, which are the positions in the width direction of the image, from each of which the amount of correction M4(x) is calculated, and is stored in the correction memory 211. However, the number of areas or portions in the image-width direction from which the sh sensitivity (sh(x)) is obtained on an individual basis may be smaller than or greater than the number of multiple areas in the main scanning direction or the image-width direction from each of which the amount of correction M4(x) is calculated.

For example, the main scanning direction may be divided into a rear (R) side of the apparatus and a front (F) side of the apparatus, and the number of the areas or portions in the image-width direction from which the sh sensitivity (sh(x)) is obtained on an individual basis may be two. In such a configuration, the average value of the image densities ID of those areas in the detection data may be used as the image density ID of a pair of areas in the main scanning direction in the three patterns. As described above, by reducing the number of values of sh sensitivity (sh(x)), the volume of the storage area can be reduced, or the processes of calculating the amount of correction M4(x) can be simplified. Accordingly, the length of processing time earn be reduced.

The she sensitivity (sh(x)) to be stored in the correction memory 211 may be stored after sales of the image forming apparatus 1. In such a configuration, the above three patterns are formed on the sheet, and those three patterns on the sheet are detected by the density sensor 70 that serves as a density detection device 190. Subsequently, the she sensitivity (sh (x)) is calculated based on the image density (ID) of the patterns detected by the density sensor 70, and is stored in the correction memory 211.

In the above description of the present embodiment, cases are described in which the density sensor 70 is arranged downstream from the fixing device 104 in the sheet conveyance direction and the image density (ID) on the sheet P' is detected. However, no limitation is intended thereby. For example, the density sensor 70 may detect the image density (ID) on the photoconductor or the amount of adhered toner per each unit of dimension. Alternatively, the density sensor 70 may detect the image density (ID) on the intermediate transfer belt or the amount of adhered toner per each unit of dimension.

The embodiments described above are given by way of example, and unique advantageous effects are achieved for each of the following modes given below.

First Mode

In the first mode of the present disclosure, the image forming apparatus 1 includes an image forming device such as the printer engine 100 that forms an image on an image bearer such as the photoconductor 120 or the intermediate transfer belt 130 based on a predetermined image-forming condition, and a corrector such as the controller 180 that changes the predetermined image-forming condition such as the LD power of the exposure device 101 and corrects the image-density unevenness in the image-width direction or the main scanning direction orthogonal to the sub-scanning direction or the image conveyance direction of the image bearer. In the image forming apparatus 1 according to the first mode of the present disclosure, the corrector is configured to calculate the corrective value of the image-forming condition such as the amount of correction M4(x) for each one of a plurality of positions in the image-width direction based on an unevenness-in-density corrective value such as the multiple differences ΔID(x) for each of a plurality of positions in the image-width direction such as the multiple areas in the main scanning direction x and a relational value such as the sh sensitivity indicating the relation between a plurality of unevenness-in-density corrective values and the corrective value of the prescribed image-forming condition. In the image forming, apparatus 1 according to the first mode of the present disclosure, the corrector is configured to correct the image-density unevenness in the image-width direction based on the corrective value of the image-forming condition at the multiple positions in the image-width direction. The image forming apparatus 1 according to the first mode of the present disclosure further includes the memory 210 that stores the multiple relational values such as the multiple values for the sh sensitivity sh(x), which correspond to a plurality of portions in the image-width direction such as the multiple areas in the main scanning direction x, respectively. In the image forming apparatus 1 according to the first mode of the present disclosure, the corrector is configured to calculate the corrective value of the prescribed image-forming condition for each one of the multiple positions in the image width direction, based on the multiple unevenness-in-density corrective values, using the relational value corresponding to the multiple portions in the image-width direction including the multiple positions in the image-width direction.

As known in the art, when the unevenness in the density of an image in the image-width direction is to be corrected, the multiple unevenness-in-density corrective values for the multiple positions in the image-width direction are obtained based on, for example, the results of the detection of the image density at the multiple positions of the adjustment patterns for the unevenness in density in the width direction of the image. Note that the unevenness in the density of an image in the image-width direction may be referred to simply as the unevenness in the density of an image in the following description. Subsequently, the corrective value of the image-forming condition for each one of a plurality of positions in the image-width direction is calculated based on the obtained multiple unevenness-in-density corrective values and a relational value indicating the relation between the multiple unevenness-in-density corrective values and the corrective value of the image-forming condition. The predetermined image-forming condition is modified using the above calculated corrective value of the image-forming condition for each one of the multiple positions in the image-width direction. As a result, the unevenness in the density of the image, which is formed under the modified image-forming condition, in the image-width direction is corrected.

However, there are some cases which the image-density unevenness in the image-width direction cannot sufficiently be corrected in the image forming apparatus that corrects the unevenness in density of an image as above. What is more, if the same relational value is used regardless of the position in the width direction of the image to calculate the corrective value of the prescribed image-forming condition for each one of a plurality of positions in the image-width direction, the image-density unevenness cannot sufficiently be corrected.

More specifically, the relation between the multiple unevenness-in-density corrective values and the corrective value of the prescribed image-forming condition is not constant in the image-width direction, and the relation is different among the multiple areas in the image-width direction.

When the relation is different among the multiple areas in the image-width direction, the corrective value of the prescribed image-forming condition cannot appropriately be calculated at a position in the image-width direction that has a relation different from the relation indicated by relational value. As a result, the unevenness in the density of an image cannot sufficiently be corrected.

In order to deal with such a situation, in the present mode, a plurality of relational values that correspond to the multiple portions in the image-width direction are stored in the memory. Moreover, for the multiple unevenness-in-density corrective values for the multiple positions in the image-width direction, the corrective value of the prescribed image-forming condition for each one of a plurality of positions in the image-width direction is calculated, using the relational value that corresponds to the multiple portions in the image-width direction including a plurality of positions in the image width direction.

With the image forming apparatus 1 according to the first mode of the present disclosure, compared with cases in which the same relational value is used for each of the multiple unevenness-in-density corrective values for each one of the positions in the image-width direction, the corrective value of the prescribed image-forming condition that is calculated for each one of at a plurality of positions in the image-width direction gets close to an appropriate corrective value. Accordingly, the unevenness in density of an image can be corrected to a sufficient degree.

Second Mode

According to the second mode of the present disclosure in the image forming apparatus 1 according to the first mode of the present disclosure, the image forming device exposes the image bearer to light based on the image data, and forms an image with the image density (ID) that corresponds to the exposure value such as the LD power. According to the second mode of the present disclosure, the corrective value of the prescribed image-forming condition is a corrective value such as the amount of correction M4(x) used to change the exposure value.

With the image forming apparatus 1 according to the first mode of the present disclosure, the exposure value is changed, and the image density (ID) at the multiple positions in the width direction of the image is adjusted. Accordingly, the unevenness in the density of an image can easily be controlled and corrected.

Third Mode

According to the third mode of the present disclosure, in the image forming apparatus 1 according to the first or second mode of the present disclosure, the relational value is a factor of proportionality such as the sh sensitivity indicating the ratio of the corrective value of the prescribed image-forming condition to the multiple unevenness-in-density corrective values, and the corrector is configured to multiply the multiple unevenness-in-density corrective values by the relational value corresponding to the multiple portions in the image-width direction including the multiple portions in the image-width direction including a plurality of positions in the image-width direction, to calculate the corrective value of the prescribed image-forming condition for each one of a plurality of positions in the image-width direction.

With the image forming apparatus 1 according to the third mode of the present disclosure, the corrective value of the prescribed image-forming condition for each one of a plurality of positions in the image-width direction can easily be calculated.

Fourth Mode

According to the fourth mode of the present disclosure, the image forming apparatus 1 according to an one of the first mode to the third mode of the present disclosure further includes the density detection device 190 that is configured to detect the image density (ID) at the multiple positions in the image-width direction, and the corrector is configured to obtain the multiple unevenness-in-density corrective values such as the multiple differences ΔID(x), based on a result of detection performed by the density detection device on the predetermined adjustment patterns for the unevenness in density such as the multiple adjustment patterns D1, D2, D3, and D4 that are formed by the image forming device.

With the image forming apparatus 1 according to the first mode of the present disclosure, due to, for example, the variations in the shape or characteristics of the multiple members of the image forming apparatus 1 the changes over time, and the changes in the environment where the image forming apparatus 1 is arranged, even if the unevenness in the density of an image varies, the unevenness in the density of an image after the variation can appropriately be corrected.

Fifth Mode

According to the fifth mode of the present disclosure, in the image forming apparatus 1 according to the fourth mode of the present disclosure, the density detection device uses a plurality of detectable areas such as the multiple detectable areas of the multiple photoreceptors 72-0 to the 72-63 disposed in the image-width direction to detect an image density (ID) as the multiple portions in the image width direction.

With the image forming apparatus 1 according to the first mode of the present disclosure, the unevenness in density of an image can be corrected with a high degree of precision.

Sixth Mode

According to the sixth mode of the present disclosure, in the image forming apparatus 1 according to any one of the first mode to the fourth mode of the present disclosure, the multiple portions in the image-width direction corresponding to the multiple relational values are broader than a plurality of areas at the multiple positions in the image-width direction corresponding to the multiple unevenness-in-density corrective values.

With the image forming apparatus 1 according to the first mode of the present disclosure, the work load of calculating the corrective value of the prescribed image-forming condition at a plurality of positions in the image-width direction can be reduced.

Seventh Mode

According to the seventh mode of the present disclosure, the image forming apparatus 1 according to any one of the first mode to the sixth mode of the present disclosure further includes the density detection device 190 that detects the multiple image densities (ID) at the multiple positions in the image-width direction. In the image forming apparatus 1 according to the seventh mode of the present disclosure, the image forming device is configured to form a plurality of adjustment patterns for the unevenness in density such as three adjustment patterns, and the memory is configured to store the multiple relational values calculated based on the multiple image densities (ID) detected by the density detection device.

With the image forming apparatus 1 according to the first mode of the present disclosure, due to, for example, the variations in the shape or characteristics of the multiple members of the image forming apparatus 1, the changes over time, and the changes in the environment here the image forming apparatus 1 is arranged, even if the relation between the multiple unevenness-in-density corrective values and the corrective value of the prescribed image-forming condition varies, the unevenness in the density of an image can appropriately be corrected.

Eighth Mode

According to the eighth mode of the present disclosure, in the image forming apparatus 1 according to the seventh mode of the present disclosure, the multiple portions in the image-width direction corresponding to the multiple relational values are broader than a plurality of areas at the multiple positions in the image-width direction corresponding to the multiple unevenness-in-density corrective values, and each one of the multiple relational values is calculated based on an average value of the multiple image densities (ID) at two or more of the multiple positions in the image-width direction within a range of the multiple portions in the image-width direction.

With the image forming apparatus 1 according to the first mode of the present disclosure, the workload of calculating the corrective value of the prescribed image-forming condition at a plurality of positions in the image-width direction can be reduced, and the unevenness in the density of an image can appropriately be corrected with an appropriate relational value.

Ninth Mode

According to the ninth mode of the present disclosure, the image forming apparatus 1 according to any one of the first mode to the eighth mode of the present disclosure further includes the receiver 150 configured to accept an input specifying a plurality of levels of density of an image. In the image forming apparatus 1 according to the ninth mode of the present disclosure, the image forming device is configured to form an image on an image bearer based on the prescribed image-forming condition consistent with the multiple levels of density received by the receiver 150, and the memory is configured to store the multiple relational values corresponding to the multiple portions in the image-width direction, for the multiple levels of density. In the image forming apparatus 1 according to the ninth mode of the present disclosure, the corrector is configured to calculate the corrective value of the prescribed image-forming condition for each one of the multiple positions in the image-width direction, based on the multiple relational values corresponding to the multiple levels of density received by the receiver.

With the image forming apparatus 1 according to the first mode of the present disclosure, the unevenness in the density of an image can appropriately be corrected for each one of the multiple levels of density.

Note that numerous additional modifications and variations are possible in light of the above teachings. It is therefore to be understood that within the scope of the appended claims, the embodiments of the present disclosure may be practiced otherwise than as specifically described herein. For example, elements and/or features of different illustrative embodiments may be combined with each other and/or substituted for each other within the scope of this disclosure and appended claims.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field-programmable gate array (FPGA), and conventional circuit components arranged to perform the recited functions.

What is claimed is:

1. An image forming apparatus comprising:

an image forming device configured to form an image on an image bearer based on a prescribed image-forming condition, and circuitry configured to change the prescribed image-forming condition and correct image-density unevenness in an image-width direction orthogonal to an image conveyance direction of the image bearer, the circuitry being configured to calculate a corrective value of the prescribed image-forming condition for each one of a plurality of positions in the image-width direction, based on a plurality of unevenness-in-density corrective values for the plurality of positions in the image-width direction and a plurality of relational values indicating a relation between the plurality of unevenness-in-density corrective values and the corrective value of the prescribed image-forming condition, the circuitry being configured to correct the image-density unevenness in the image-width direction based on the corrective value of the prescribed image-forming condition, the plurality of relational values corresponding to a plurality of portions in the image width direction including the plurality of positions in the image-width direction, each one of the plurality of relational values being a factor of proportionality indicating a ratio of the corrective value of the prescribed image-forming condition to the plurality of unevenness-in-density corrective values, and the circuitry being configured to multiply the plurality of unevenness-in-density corrective values for the plurality of positions in the image-width direction by the plurality of relational values corresponding to the plurality of portions in the image-width direction including the plurality of positions in the image-width direction, to calculate the corrective value of the prescribed image-forming condition for each one of the plurality of positions in the image-width direction.

2. The image forming apparatus according to claim 1, wherein the image forming device is configured to expose the image bearer to light based on image data, and form an image with an image density that corresponds to an exposure value, and wherein the corrective value of the prescribed image-forming condition is used to change the exposure value.

3. The image forming apparatus according to claim 1, further comprising a density detection device configured to detect a plurality of image densities at the plurality of positions in the image-width direction, wherein the image forming device is configured to form a plurality of adjustment patterns for unevenness in density, and wherein the circuitry is configured to obtain the plurality of unevenness-in-density corrective values for the plurality of positions in the image-width direction, based on the plurality of image densities of the plurality of adjustment patterns detected by the density detection device.

4. The image forming apparatus according to claim 3, wherein the density detection device is configured to use a plurality of detectable areas disposed in the image-width direction to detect the plurality of image densities as the plurality of portions in the image-width direction.

5. The image forming apparatus according to claim 1, wherein the plurality of portions in the image-width direction corresponding to the plurality of relational values are broader than a plurality of areas at the plurality of positions in the image-width direction corresponding to the plurality of unevenness-in-density corrective values for the plurality of positions in the image-width direction.

6. The image forming apparatus according to claim 1, further comprising:

a memory; and a density detection device configured to detect a plurality of image densities at the plurality of positions in the image-width direction, wherein the image forming device is configured to form a plurality of adjustment patterns for unevenness in density, and wherein the memory stores the plurality of relational values calculated based on the plurality of image densities of the plurality of adjustment patterns detected by the density detection device.

7. The image forming apparatus according to claim 6, wherein the plurality of portions in the image-width direction corresponding to the plurality of relational values are broader than a plurality of areas at the plurality of positions in the image-width direction corresponding to the plurality of unevenness-in-density corrective values for the plurality of positions in the image-width direction, and wherein the circuitry is configured to calculate each one of the plurality of relational values based on an average value of the plurality of image densities detected at two or more of the plurality of positions in the image-width direction within a range of the plurality of portions in the image-width direction.

8. The image forming apparatus according to claim 1, further comprising:

a memory; and a receiver configured to receive an input specifying a plurality of levels of density of an image, wherein the image forming device is configured to form the image on the image bearer based on the prescribed image-forming condition consistent with the plurality of levels of density received by the receiver, wherein the memory stores the plurality of relational values corresponding to the plurality of portions in the image-width direction, for the plurality of levels of density, and wherein the circuitry is configured to calculate the corrective value of the prescribed image-forming condition for each one of the plurality of positions in the image-width direction, based on the plurality of relational values corresponding to the plurality of levels of density received by the receiver.

* * * * *